US012461012B2

(12) United States Patent
Yamauchi et al.

(10) Patent No.: US 12,461,012 B2
(45) Date of Patent: Nov. 4, 2025

(54) PARTICLE ANALYSIS SYSTEM HAVING AUTOFLUORESCENCE SPECTRUM CORRECTION

(71) Applicant: Sony Group Corporation, Tokyo (JP)

(72) Inventors: Yasuharu Yamauchi, Tokyo (JP); Koji Futamura, Tokyo (JP); Gregory Veltri, Denver, CO (US)

(73) Assignee: Sony Group Corporation, Tokyo (JP)

( * ) Notice: Subject to any disclaimer, the term of this patent is extended or adjusted under 35 U.S.C. 154(b) by 985 days.

(21) Appl. No.: 17/620,651

(22) PCT Filed: Jun. 19, 2020

(86) PCT No.: PCT/JP2020/024072
§ 371 (c)(1),
(2) Date: Dec. 17, 2021

(87) PCT Pub. No.: WO2020/262215
PCT Pub. Date: Dec. 30, 2020

(65) Prior Publication Data
US 2022/0317019 A1 Oct. 6, 2022

Related U.S. Application Data

(60) Provisional application No. 62/865,616, filed on Jun. 24, 2019.

(51) Int. Cl.
*G01N 15/14* (2024.01)
*G01N 15/10* (2024.01)
(Continued)

(52) U.S. Cl.
CPC ......... *G01N 15/1459* (2013.01); *G01N 21/01* (2013.01); *G01N 21/6402* (2013.01);
(Continued)

(58) Field of Classification Search
CPC .............. G01N 15/1459; G01N 21/01; G01N 21/6402; G01N 2015/1006;
(Continued)

(56) References Cited

U.S. PATENT DOCUMENTS

2015/0140577 A1* 5/2015 Li .................... G01N 33/56972
250/226
2019/0137383 A1* 5/2019 Umetsu ............. G01N 15/1459
(Continued)

FOREIGN PATENT DOCUMENTS

CN 102435313 A 5/2012
CN 102901693 A 1/2013
(Continued)

OTHER PUBLICATIONS

International Search Report and Written Opinion mailed Aug. 24, 2020 in connection with International Application No. PCT/JP2020/024072.
(Continued)

*Primary Examiner* — John McGuirk
(74) *Attorney, Agent, or Firm* — Wolf, Greenfield & Sacks, P.C.

(57) ABSTRACT

A particle analysis system comprising: a light detector that acquires light generated by irradiating a particle with excitation light; and an information processing unit that outputs a spectral plot including spectrum information of an autofluorescence population specified in a two-dimensional plot of measurement data each of which corresponds to the acquired light and spectrum information of the measurement data and that records the spectrum information of the autofluorescence population as an autofluorescence reference spectrum in a fluorescence separation process.

13 Claims, 15 Drawing Sheets

(51) Int. Cl.
*G01N 21/01* (2006.01)
*G01N 21/64* (2006.01)

(52) U.S. Cl.
CPC ............... *G01N 2015/1006* (2013.01); *G01N 2021/6419* (2013.01); *G01N 2021/6441* (2013.01)

(58) Field of Classification Search
CPC ... G01N 2021/6419; G01N 2021/6441; G01N 15/1012; G01N 21/6428; G01N 2021/6421; G01N 2021/6417
See application file for complete search history.

(56) References Cited

U.S. PATENT DOCUMENTS

| | | | |
|---|---|---|---|
| 2020/0182772 A1 | 6/2020 | Umetsu et al. | |
| 2022/0034785 A1* | 2/2022 | Lo | G01N 15/1436 |

FOREIGN PATENT DOCUMENTS

| | | | | |
|---|---|---|---|---|
| CN | 109073536 A | 12/2018 | | |
| EP | 2 426 481 A1 | 3/2012 | | |
| EP | 2 551 665 A1 | 1/2013 | | |
| EP | 3 454 043 A1 | 3/2019 | | |
| JP | 5817369 B2 | 11/2015 | | |
| WO | WO-2017191699 A1 * | 11/2017 | ......... | G01N 15/1012 |
| WO | WO 2019/049442 A1 | 3/2019 | | |

OTHER PUBLICATIONS

No Author Listed, Spectral Flow Cytometry Fundamentals. Thermo Fisher Scientific. Jun. 22, 2019;8 pages. https://www.thermofisher.com/nl/en/home/life-science/cell-analysis/flow-cytometry/flow-cytometry-learning-center/flow-cytometry-resource-library/flow-cytometry-methods/spectral-flow-cytometry-fundamentals.html [Last accessed Oct. 27, 2021].

Futamura et al., Novel full-spectral flow cytometry with multiple spectrally-adjacent fluorescent proteins and fluorochromes and visualization of in vivo cellular movement. Cytometry Part A. Sep. 2015;87(9):830-42.

* cited by examiner

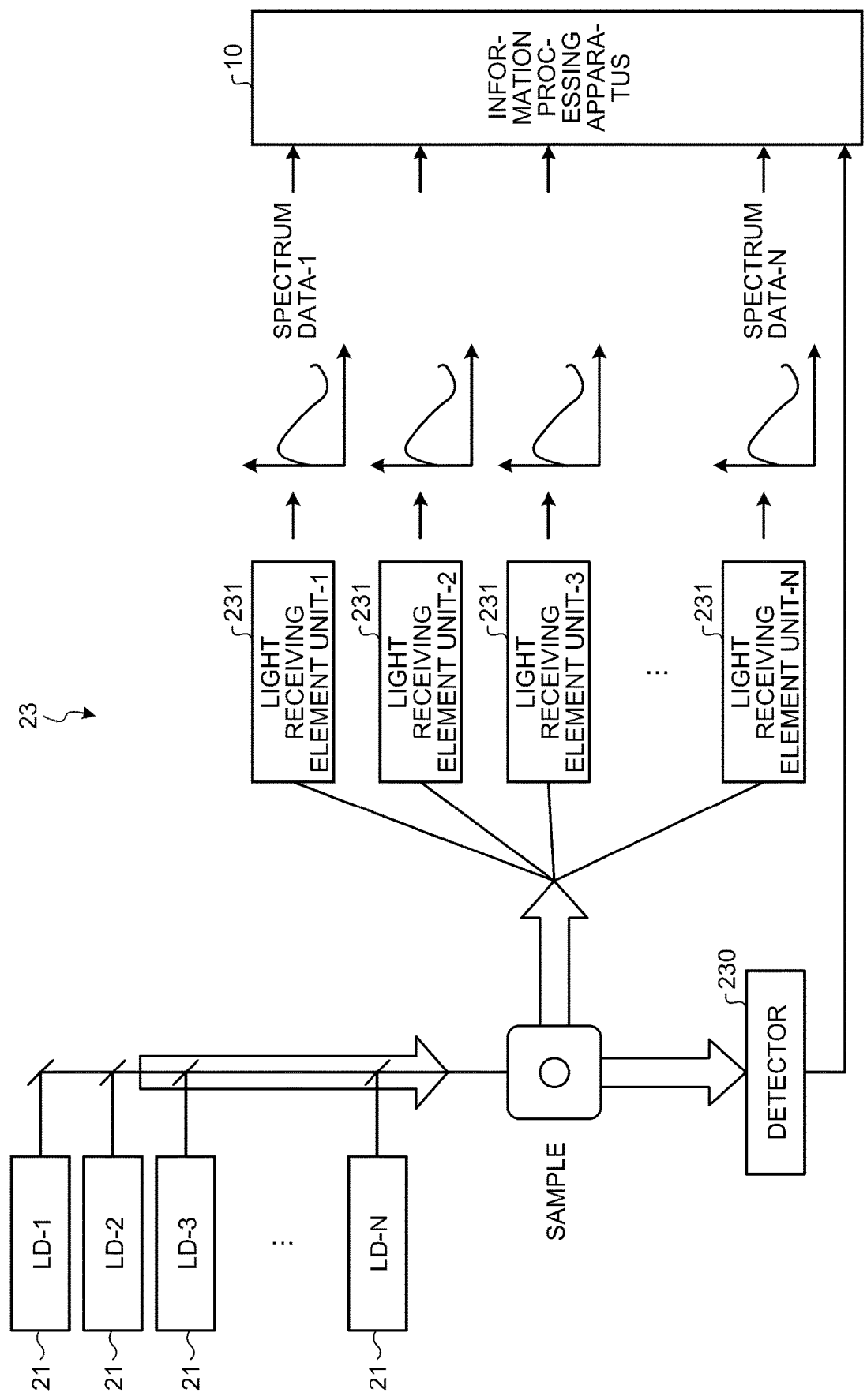

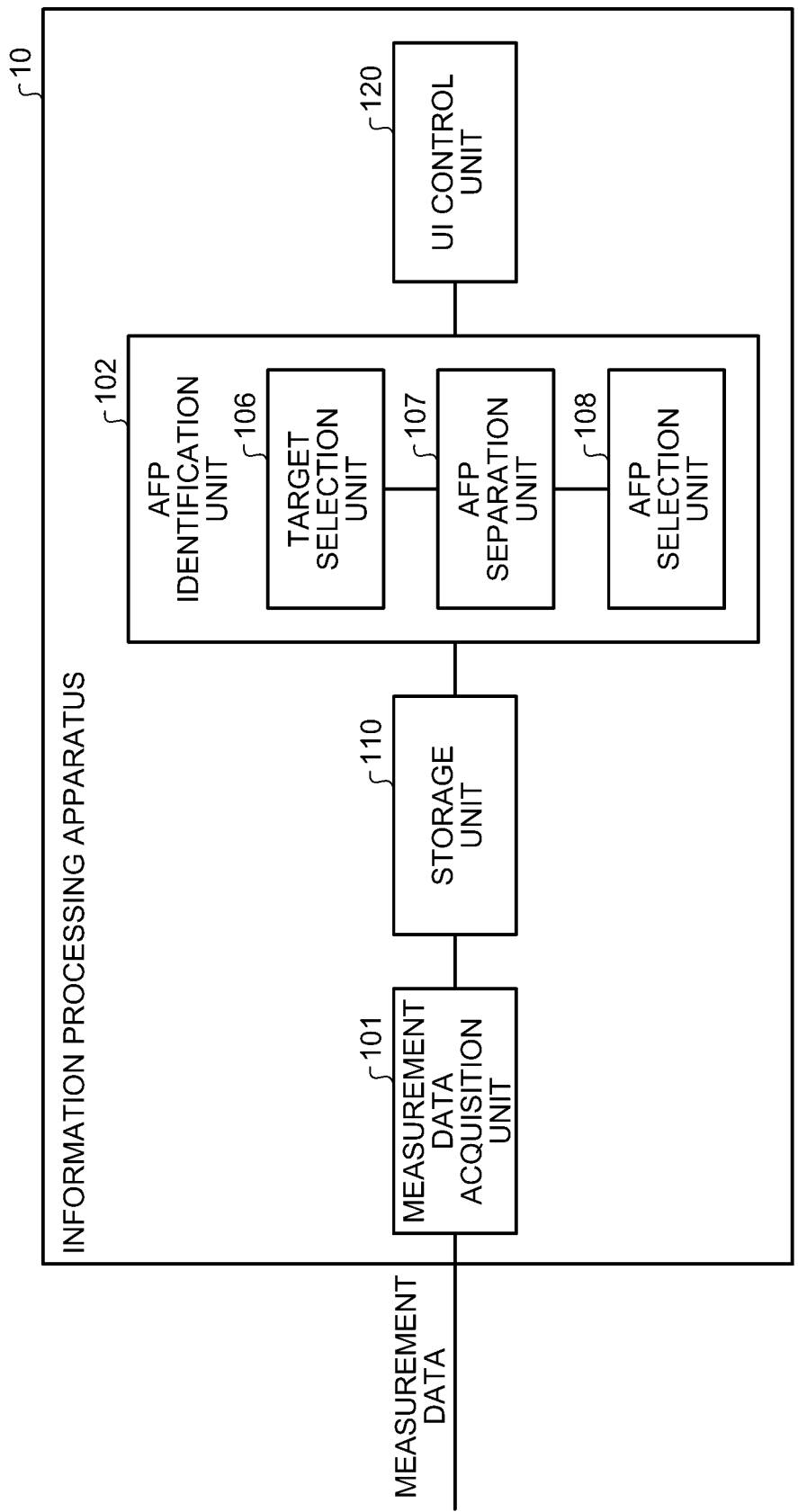

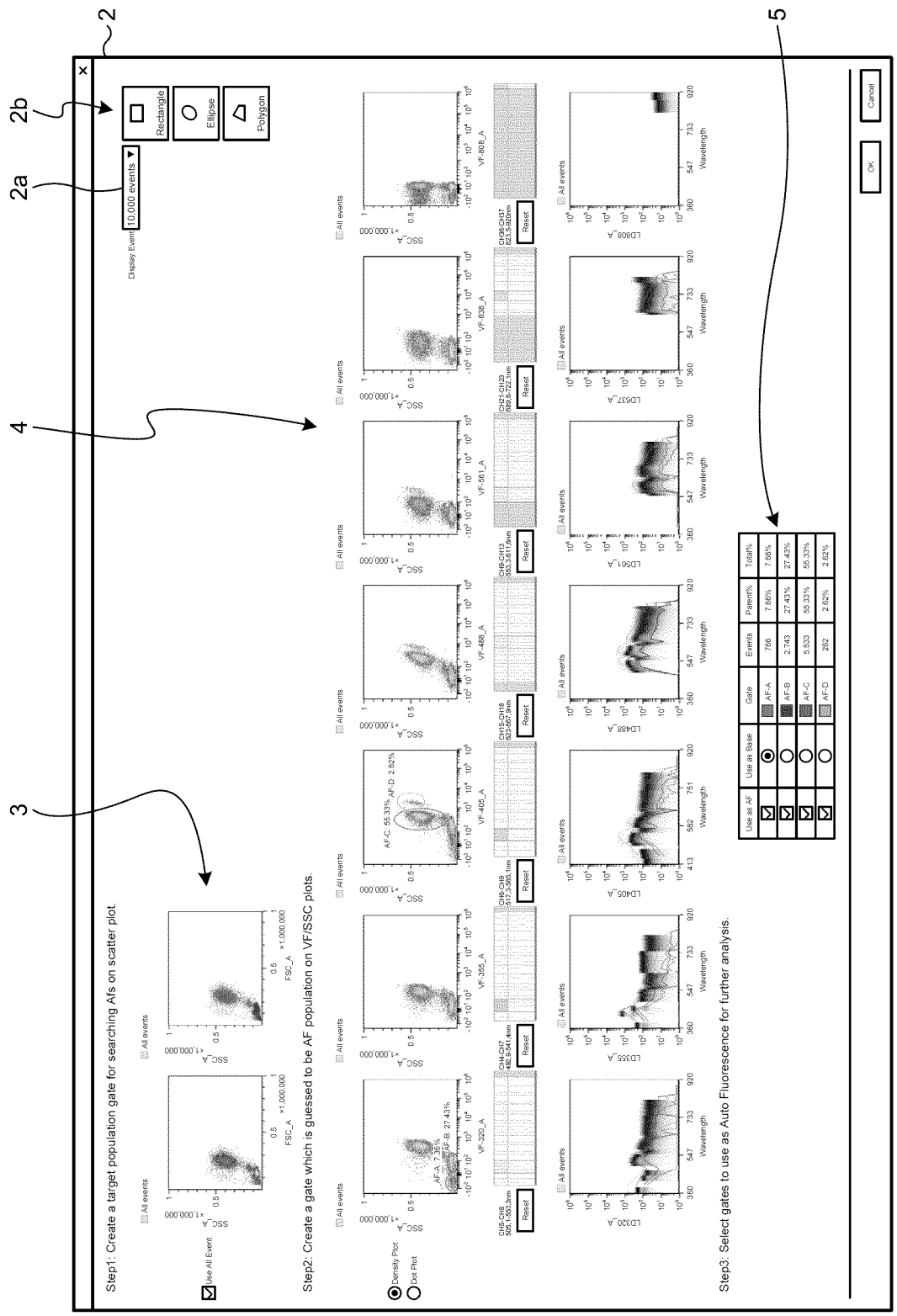

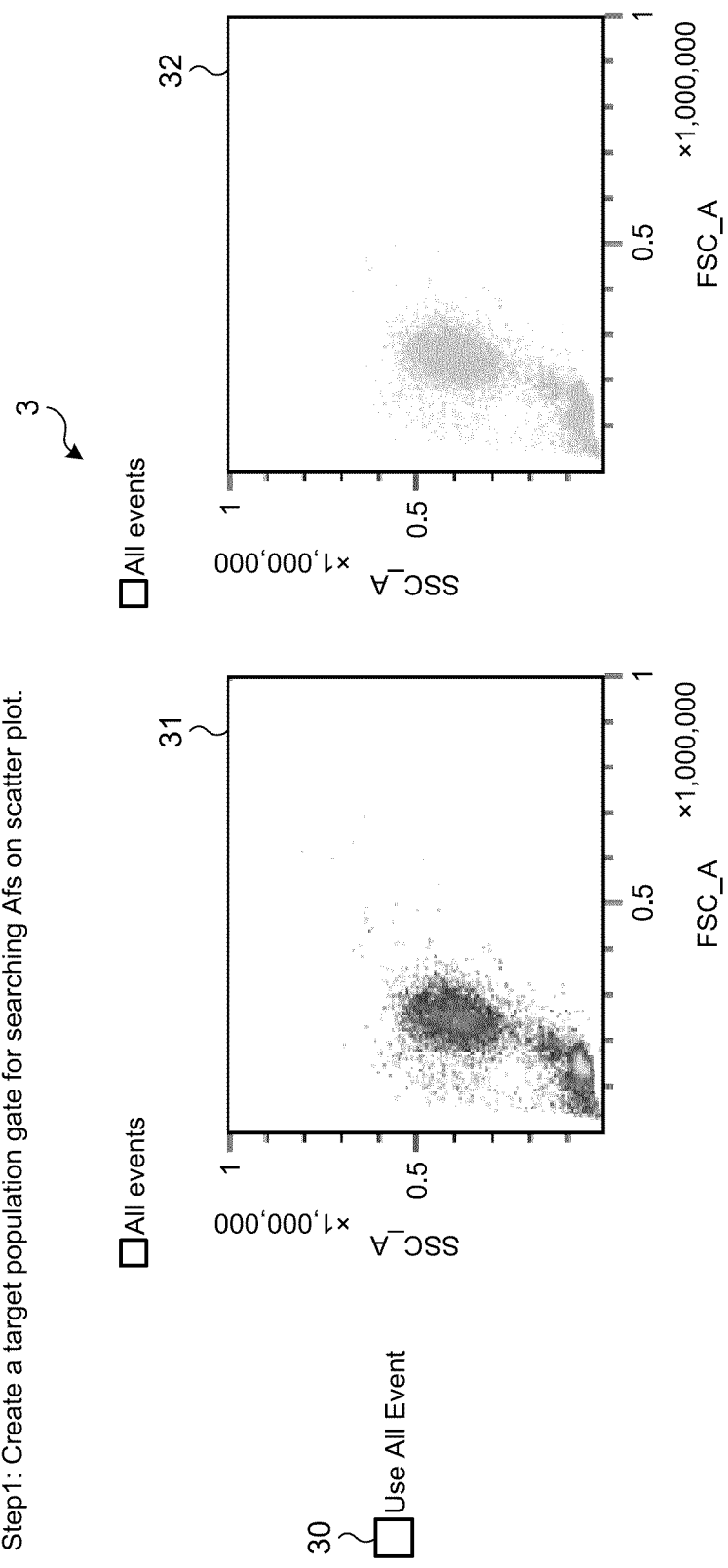

FIG.6D
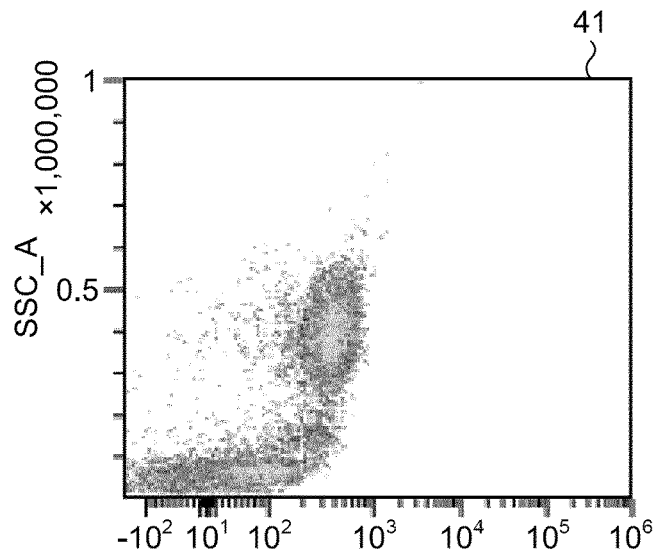
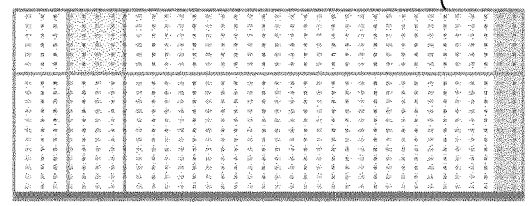
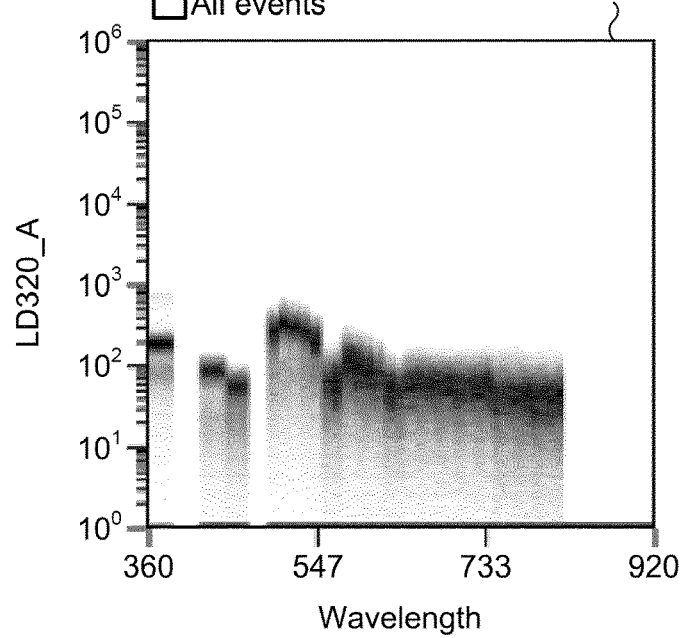

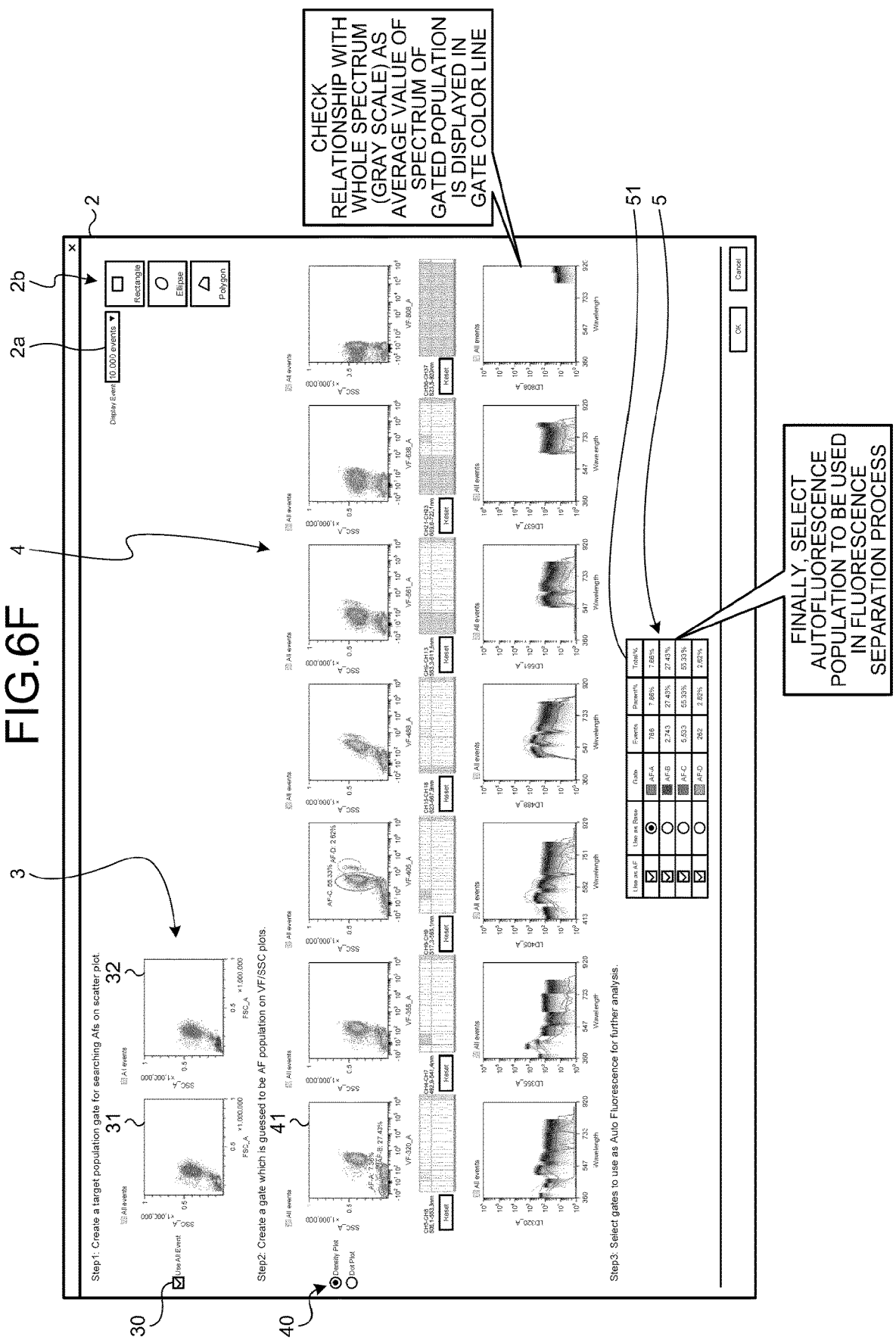

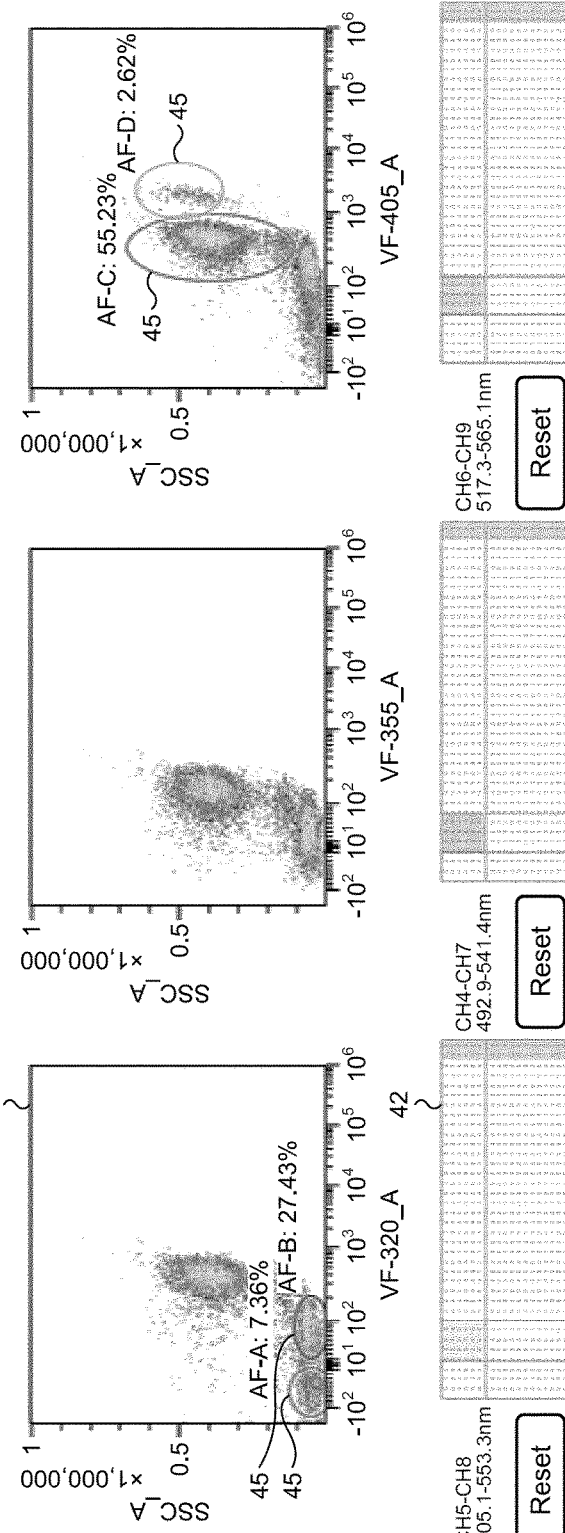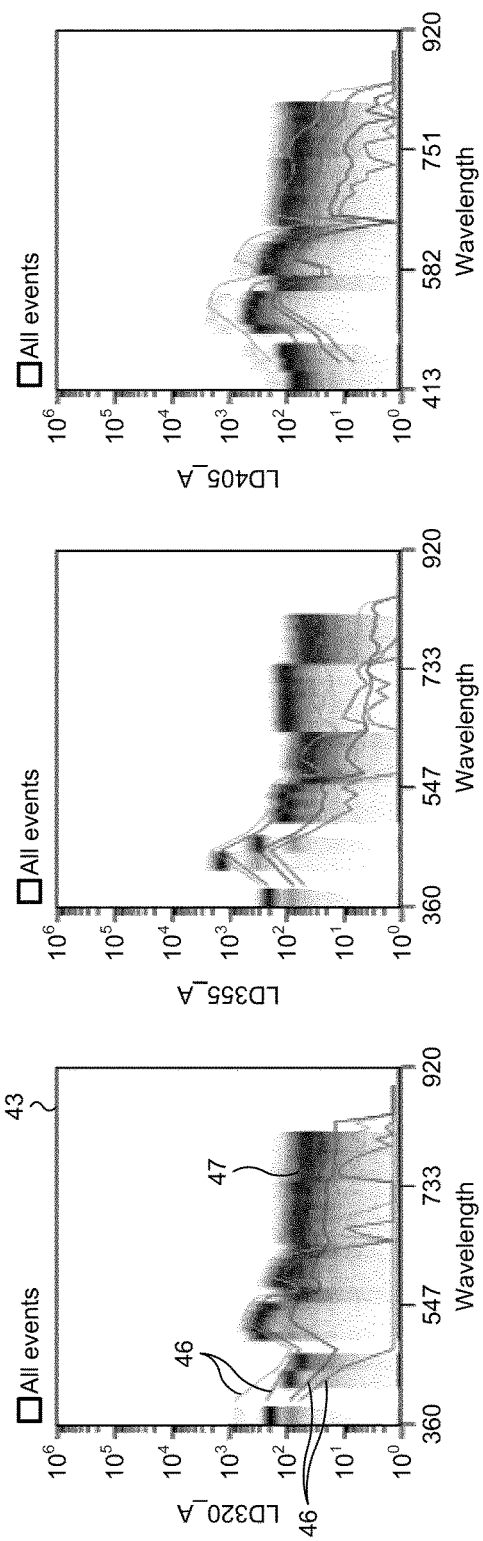
FIG.6G

FIG.6H

| Use as AF | Use as Base | Gate | Events | Parent% | Total% |
|---|---|---|---|---|---|
| ☑ | ⦿ | ▢ AF-A | 766 | 7.66% | 7.66% |
| ☑ | ○ | ▢ AF-B | 2,743 | 27.43% | 27.43% |
| ☑ | ○ | ▢ AF-C | 5,533 | 55.33% | 55.33% |
| ☑ | ○ | ▢ AF-D | 262 | 2.62% | 2.62% |

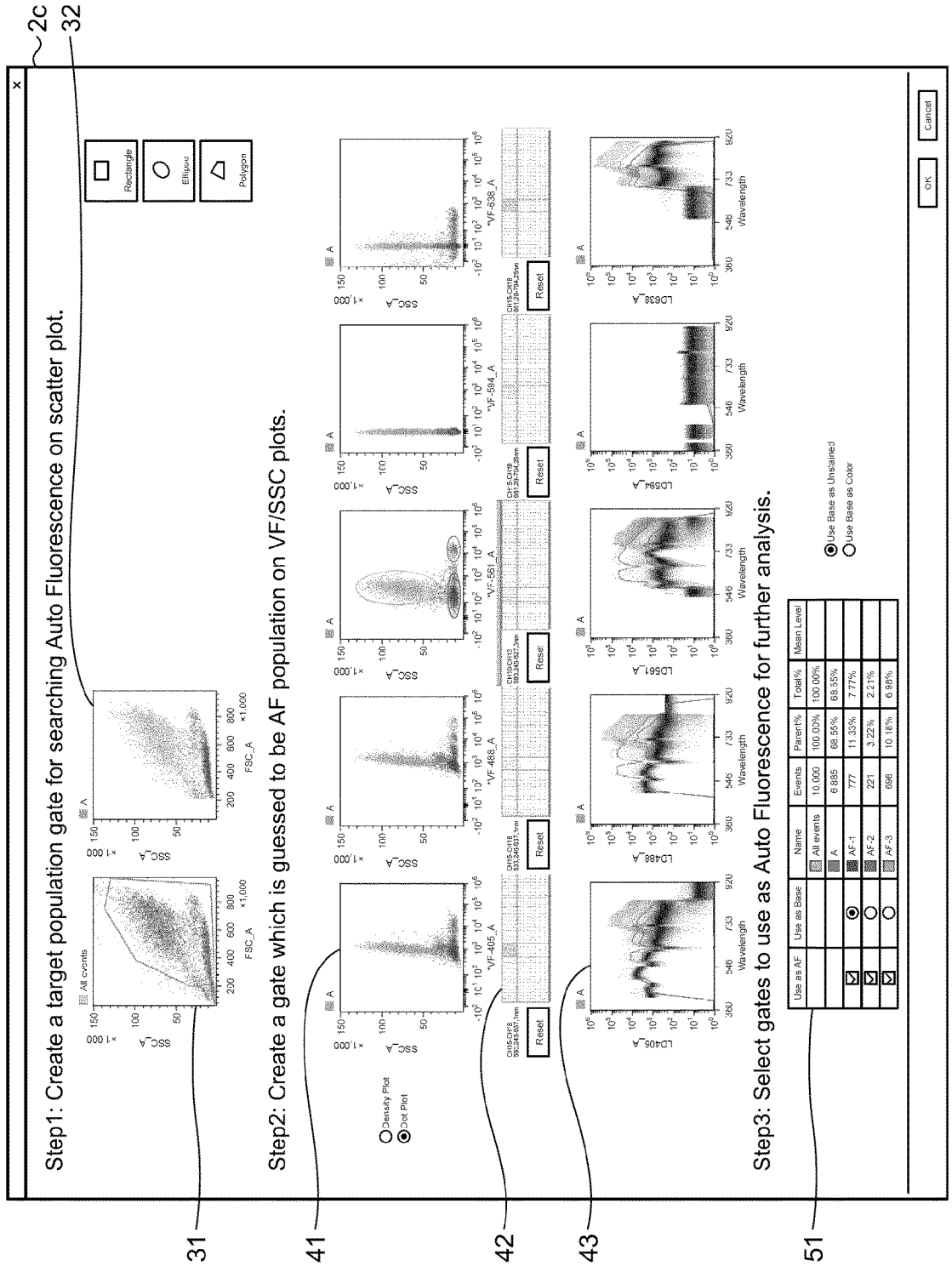

PARTICLE ANALYSIS SYSTEM HAVING AUTOFLUORESCENCE SPECTRUM CORRECTION

CROSS-REFERENCE TO RELATED APPLICATIONS

This application is a national stage filing under 35 U.S.C. § 371 of International Patent Application Serial No. PCT/JP2020/024072, filed in the Japanese Patent Office as a Receiving Office on Jun. 19, 2020, which claims the benefit of U.S. Provisional Patent Application Ser. No. 62/865,616, filed Jun. 24, 2019, each of which is incorporated herein by reference in its entirety.

TECHNICAL FIELD

The present disclosure relates to a particle analysis system, an information processing method, and a program.

BACKGROUND ART

In order to analyze properties of microparticles such as cells, microorganisms or liposomes, an analysis method using an apparatus (for example, a flow cytometer etc.) that measures the intensity and spectrum of fluorescence or scattered light emitted from the microparticles is used. For example, the flow cytometry irradiates microparticles flowing in the flow path with excitation light such as laser light, and fluorescence, scattered light, or the like emitted from microparticles is detected by a light detector such as a plurality of photo multiplier tubes (PMT). The detected light is quantified by being converted into an electrical signal. By subjecting this quantified data to statistical processing, the characteristics of the above-mentioned microparticles are analyzed.

For fluorescence detection in a flow cytometer, in addition to a method of selecting a plurality of light beams in discontinuous wavelength ranges using wavelength selection elements such as a filter and measuring the light intensity of each wavelength range, there is also a method of measuring the intensity of light as a spectrum in a continuous wavelength range. For example, there is a technique for analyzing the fluorescence intensity of each light emitting element such as a fluorescent dye with which microparticles are labeled by separating (deconvoluting) the spectrum obtained by irradiating microparticles labeled with a plurality of fluorescent dyes with laser light by the spectrum (spectral reference) for each fluorescent dye. According to this technique, the measured spectrum can be expressed as a linear sum of values obtained by multiplying reference spectra for each light emitting element by a predetermined co-efficient. Thereby, the fluorescence intensity of each fluorescent dye with which microparticles are labeled can be calculated.

Analytical data at a spectral flow cytometer can be displayed in a spectral plot, as well as a histogram and a two-dimensional plot. The spectral plot indicates the channel or the detection wavelength of the light receiving element as the horizontal axis and the light intensity as the vertical axis, and is a representation of information (population information) on the number of microparticles (number of events or density) in shading or tone of color. The spectral plot makes it possible to intuitively grasp the fluorescence spectrum and the population information of microparticles.

In the spectral plot, when a logarithmic axis is used as a coordinate axis indicating the light intensity, there is a difficulty in that the spectrum of microparticles with low intensity is expressed with an excessively high dispersion, and negative numbers cannot be displayed. In addition, the use of a linear axis makes it difficult to determine the spectral shape of microparticles with low intensity. Therefore, Patent Literature 1 below discloses a technique of using a linear axis for data smaller than a predetermined value and using a logarithmic axis for data larger than the predetermined value.

CITATION LIST

Patent Literature

PTL 1: JP 5817369 B2

SUMMARY

Technical Problem

Since many of the minute substances which are the object to be measured by the flow cytometer emit autofluorescence, in order to accurately analyze the fluorescence intensity, it is necessary to identify the autofluorescence of the object to be measured, and perform correction based on the identified autofluorescence.

In addition, since the autofluorescence varies depending on the type of microparticles, the substance contained, etc., the object to be measured may include populations with different autofluorescence. Therefore, identifying a plurality of autofluorescence populations (AFPs) with different autofluorescence from the measurement data will increase the accuracy of the analysis, but it is not easy to separate a plurality of autofluorescence populations from the measured autofluorescence.

Thus, the present disclosure proposes a particle analysis system, an information processing method, and a program that facilitate identification of a plurality of autofluorescence populations.

Solution to Problem

According to this disclosure, there is provided a particle analysis system including a light detector that acquires light generated by irradiating a particle with excitation light, and an information processing unit that outputs a spectral plot including spectrum information of an autofluorescence population specified in a two-dimensional plot of measurement data each of which corresponds to the acquired light and spectrum information of the measurement data and that records the spectrum information of the autofluorescence population as an autofluorescence reference spectrum in a fluorescence separation process.

In addition, according to the present disclosure, there is provided an information processing method including, by a processor, outputting a spectral plot including spectrum information of an autofluorescence population specified in a two-dimensional plot of measurement data each of which corresponds to light generated by irradiating a particle with excitation light and spectrum information of the measurement data; and recording the spectrum information of the autofluorescence population as an autofluorescence reference spectrum in a fluorescence separation process.

As described above, according to the present disclosure, identification of a plurality of autofluorescence populations can be facilitated.

Note that the above-mentioned effects are not necessarily limiting, and, along with or instead of the above-mentioned effects, any of the effects illustrated in the present specification or other effects that can be grasped from the present specification may be exhibited.

BRIEF DESCRIPTION OF DRAWINGS

FIG. 3 is a diagram illustrating an example of the configuration of a flow cytometer.

FIG. 4 is a functional block diagram illustrating an example of a functional configuration of an information processing apparatus according to an embodiment of the present disclosure.

FIG. 5 is a view illustrating an example of an autofluorescence screen used to identify an autofluorescence population.

FIG. 6B is an enlarged view of a step #1 part.

FIG. 6D is a diagram illustrating a two-dimensional plot, a VF adjustment window and a spectral plot for one laser light source.

FIG. 6F is a diagram illustrating a state in which an autofluorescence population is separated.

FIG. 6G is an enlarged view of a portion of a step #2 part in FIG. 6F.

FIG. 6H is an enlarged view of a list.

FIG. 7 is a diagram illustrating an example of an autofluorescence screen when only five laser light sources are used.

DESCRIPTION OF EMBODIMENTS

Hereinafter, preferred embodiments of the present disclosure will be described in detail with reference to the accompanying drawings. The description will be made in the following order.

Figure 1:
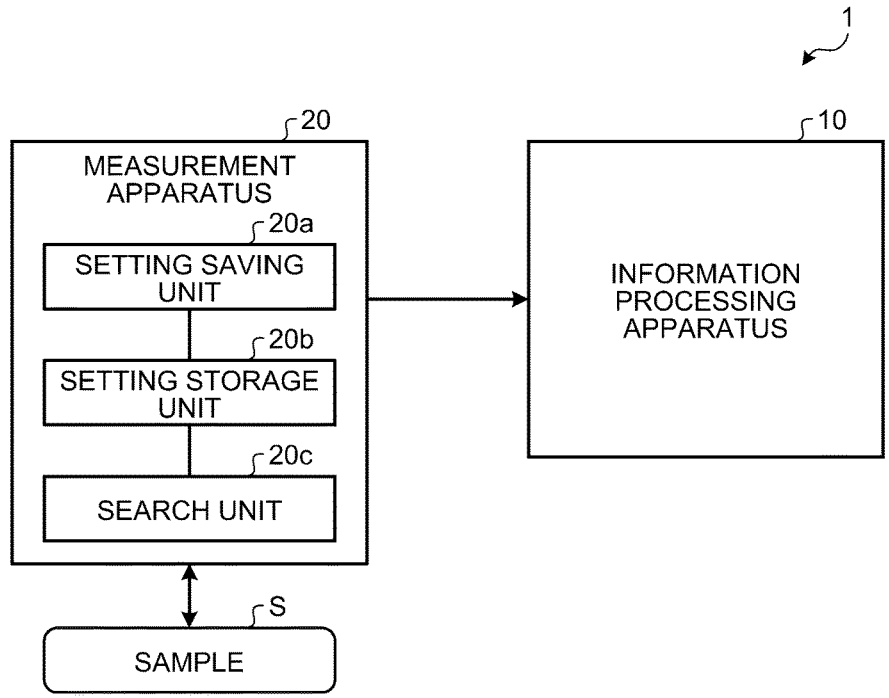
FIG. 1 is a diagram illustrating a schematic configuration of a particle analysis system according to an embodiment of the present disclosure.

1. Embodiment
1.1 Configuration of particle analysis system
1.2 Configuration of measurement apparatus
1.3 Functional configuration of information processing apparatus
1.4 Examples of screens used to identify autofluorescence population
1.5 Processing flow of identifying autofluorescence population
1.6 Ribbon plot display and user operation flow
1.7 Effects
1.8 Example of hardware configuration of information processing apparatus
1.9 Summary 1. Embodiment 1.1 Configuration of Information Processing System FIG. 1 is a diagram illustrating a schematic configuration of a particle analysis system 1 according to an embodiment of the present disclosure. As illustrated in FIG. 1, the particle analysis system 1 includes an information processing apparatus 10 and a measurement apparatus 20 that measures a spectrum corresponding to a sample S. The information processing apparatus 10 and the measurement apparatus 20 are connected by various wired or wireless networks.

Examples of the microparticles as the sample S in the present embodiment include cells, microorganisms, and biologically relevant microparticles. Biologically relevant microparticles include chromosomes, liposomes, mitochondria, organelles (cellular organelles) and the like that constitute various cells. Cells include animal cells (such as blood cells) and plant cells. Microorganisms include bacteria such as *E. coli*, viruses such as tobacco mosaic virus, and fungi such as yeast. In addition, biologically relevant microparticles may include biologically relevant polymers such as nucleic acids, proteins such as enzymes, or complexes thereof.

The information processing apparatus 10 acquires measurement data of the sample S measured by the measurement apparatus 20, separates the spectrum as the acquired measurement data into a plurality of spectra, and analyzes the intensities of the separated spectra. For example, the information processing apparatus 10 separates the acquired fluorescence spectrum of the sample S into fluorescence spectra derived from the plurality of fluorescent dyes with which the sample S is labeled, and analyzes the amount of fluorescence of separated respective fluorescence spectra. Based on this amount of fluorescence, it is possible to analyze the properties of the labeled microparticles.

In the example illustrated in FIG. 1, although a case where the information processing apparatus 10 according to the present embodiment is provided as an apparatus different from the measurement apparatus 20 is illustrated, the function of the information processing apparatus 10 according to the present embodiment may be implemented in a computer that controls the operation of the measurement apparatus 20, or it may be implemented in a computer provided in the housing of the measurement apparatus 20. The detailed configuration of the information processing apparatus 10 will be described in detail later.

The measurement apparatus 20 irradiates the sample S with laser light, detects fluorescence and scattered light from the sample S, and measures a spectrum corresponding to the sample S from the detection results of the light. That is, the measurement apparatus 20 has a function as a measurement unit.

In the following, the measurement apparatus 20 is a flow cytometer that measures the fluorescence spectrum of the sample S, and a detailed description of the present technology will be given.

1.2 Configuration of Measurement Apparatus

Figure 2:
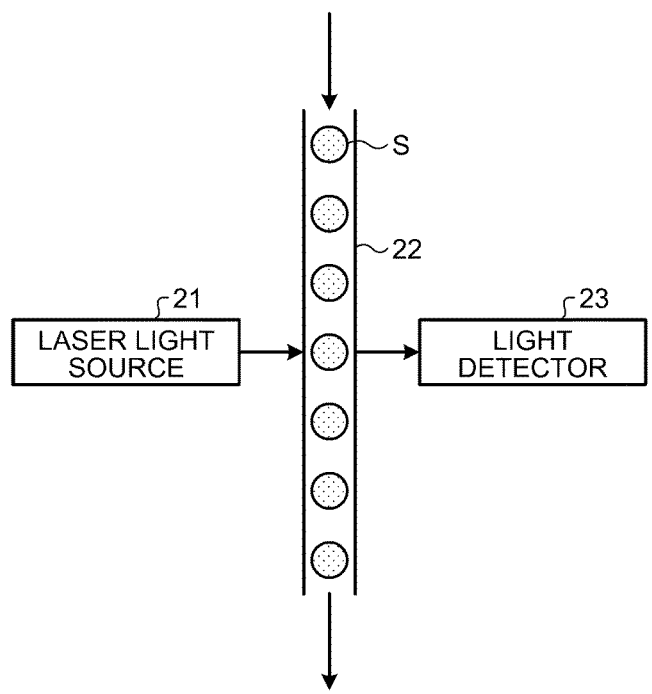
FIG. 2 is a diagram illustrating a schematic configuration of a flow cytometer which is an example of a measurement apparatus.

Next, the configuration of the measurement apparatus 20 will be described. FIG. 2 is a view illustrating a schematic configuration of a flow cytometer which is an example of the measurement apparatus. Moreover, FIG. 3 is a diagram illustrating an example of a structure of a flow cytometer. The flow cytometer illustrated in FIGS. 2 and 3 includes a laser light source 21, a microchannel 22, and a light detector 23.

Referring to FIG. 2, in the flow cytometer, laser light having a wavelength capable of exciting a fluorescent dye that can be used for staining of microparticles (samples) S is emitted from the laser light source 21 to the simple stained, multiple stained or unstained microparticles S flowing in the microchannel 22. The light detector 23 detects fluorescence, scattered light, or the like emitted from the microparticles S irradiated with the laser light. Further, although not illustrated in FIGS. 2 and 3, an optical system such as a lens for guiding laser light to the microparticles S, and an optical system for guiding fluorescence, scattered light, or the like emitted from the microparticles S to the light detector 23 are provided in the flow cytometer.

The laser light source 21 emits laser light of a predetermined wavelength (for example, wavelength λ=320 nm (nanometre), 355 nm, 405 nm, 488 nm, 561 nm, 637 nm, and 808 nm). In the example of FIG. 2, one laser light source 21 is illustrated, and in the example of FIG. 3, N (N is a positive integer) laser light sources 21 represented by LD-1 to LD-N are illustrated. N is preferably 3 or more where each laser light source has 405 nm, 488 nm and 637 nm. Most preferably, by using seven laser light sources 21 further including 320 nm, 355 nm, 561 nm and 808 nm, it is possible to cover the excitation wavelength range of fluorescent dyes of 40 or more colors.

The N laser light sources 21 irradiate the microparticle S with excitation lights in different axes. When using three laser light sources, it is preferable to arrange 405 nm in the upstream direction of the flow of microparticle S, and 808 nm and 637 nm in the downstream direction of the flow of microparticle S centering on the laser spot of 488 nm, and when using seven laser light sources, it is preferable to arrange 561 nm, 405 nm, and 320 nm in the upstream direction of the flow of the microparticle S, and 808 nm, 355 nm, and 637 nm in the downstream direction of the flow of the microparticle S. This arrangement makes it possible to reduce crosstalk in detecting a fluorescence spectrum for each excitation wavelength.

The microchannel 22 is provided to flow the microparticles S in a row in a flow direction. A known microchannel chip or the like is used as the microchannel 22.

Further, as illustrated in FIG. 3, the light detector 23 includes a detector 230 and N light receiving element units 231.

The detector 230 is a device for detecting forward scattered light emitted from the microparticle S. The detector 230 is realized by, for example, a charge coupled device (CCD), a complementary metal oxide semiconductor (CMOS), or a photodiode. Measurement data of forward scattered light detected by the detector 230 is output to the information processing apparatus 10 according to the present embodiment.

The light receiving element unit 231 is a device for detecting the fluorescence spectrum emitted from the microparticle S. Each light receiving element unit 231 detects the fluorescence spectrum emitted from the microparticle S by the radiation of the laser light by the corresponding laser light source 21. In addition, some light receiving element units 231 also detect side scattered light.

Each light receiving element unit 231 has a detection wavelength range longer than the excitation wavelength according to the excitation wavelength of the laser light source 21. For example, when the excitation wavelength is 320 nm and 355 nm, the detection wavelength range is 360.5 to 843.8 nm, and when the excitation wavelength is 405 nm, the detection wavelength range is 413.6 to 843.8 nm. When the excitation wavelength is 488 nm, the detection wavelength range is 492.9 to 843.4 nm, when the excitation wavelength is 561 nm, the detection wavelength range is 555.3 to 843.8 nm, when the excitation wavelength is 638 nm, the detection wavelength range is 643.3 to 843.8 nm, and when the excitation wavelength is 808 nm, the detection wavelength range is 823.5 to 920.0 nm. As described above, it is possible to generate spectrum data by a wide detection wavelength range longer than the excitation wavelength and to separate and detect spectra corresponding to 40 or more fluorescent dyes.

Spectrum data is generated from each light receiving element unit 231, and the generated spectrum data is output to the information processing apparatus 10 according to the present embodiment. Further, side scattered light data is generated from some light receiving element units 231, and the generated side scattered light data is output to the information processing apparatus 10 according to the present embodiment.

Further, as illustrated in FIG. 1, the measurement apparatus 20 includes a setting saving unit 20a, a setting storage unit 20b, and a search unit 20c. The setting saving unit 20a stores as setting information the parameters and labels set in the measurement in the setting storage unit 20b. The setting storage unit 20b stores setting information. The search unit 20c searches for and displays setting information using at least one of the parameter and the label selected by the user. The control unit controls the laser light source 21, the light detector 23, and the like in the measurement apparatus 20 based on the setting information selected by the user in the display screen.

The parameters include ON/OFF of each laser light source 21, the flow velocity of the microchannel 22, sensitivity adjustment values of the detector 230 and the light receiving element unit 231, a threshold for detection as a cell, a detection time window, and the like.

The label is information on measurement. Examples of the label include "TBNK panel", "T cell 20C", "PD-1 30C", "Prof. Yamauchi", "OMIP-15", "Euroflow", "44 color", and the like. "TBNK panel" is an example indicating a cell type. "T cell 20C" is an example indicating a cell type and the number of colors. "PD-1 30C" is an example indicating a cell (receptor) type and the number of colors. "Prof. Yamauchi" is an example indicating a measurement performer or a measurement requester. "OMIP-15" is an example indicating a standard measurement protocol. "Euroflow" is an example indicating a standardization organization name. "44 color" is an example indicating the number of colors.

By reusing the parameters stored in the setting storage unit 20b, the user can efficiently perform setting of the parameters. Here, the configuration of any or all of the setting saving unit 20a, the setting storage unit 20b, and the search unit 20c may be included in the information processing apparatus 10 instead of the measurement apparatus 20.

1.3 Functional Configuration of Information Processing Apparatus

Next, the functional configuration of the information processing apparatus 10 according to an embodiment of the present disclosure will be described. FIG. 4 is a functional block diagram illustrating an example of a functional configuration of the information processing apparatus 10 according to an embodiment of the present disclosure. As illustrated in FIG. 4, the information processing apparatus 10 according to the present embodiment includes a measurement data acquisition unit 101, an AFP identification unit 102, a storage unit 110, and a UI control unit 120.

(Measurement Data Acquisition Unit)

The measurement data acquisition unit 101 acquires, from the measurement apparatus 20, measurement data generated by the measurement apparatus 20. Here, the measurement data of the microparticles S acquired from the measurement apparatus 20 is, for example, autofluorescence data representing the intensities of forward scattered light, side scattered light, and spectra generated by irradiating a plurality of unstained microparticles S with laser light. For measurement of forward scattered light, side scattered light and spectra for a plurality of microparticles S, there is a small but a certain time width. Therefore, for example, a cumulative intensity, a maximum intensity, or a time width (detection time width) exceeding a detection threshold in the minute time width is used as the measurement data according to the present embodiment.

The measurement data acquisition unit 101 stores the acquired measurement data in the storage unit 110. At this time, the measurement data acquisition unit 101 may associate the acquired measurement data with time information such as the date and time when the measurement data was acquired, or information related to the measurement condition of the measurement apparatus 20 to store the information in the storage unit 110.

The AFP identification unit 102 identifies the autofluorescence population by interacting with the user via the UI control unit 120. Specifically, the AFP identification unit 102 creates a two-dimensional plot, a spectral plot, and the like used to identify the autofluorescence population based on the autofluorescence data stored in the storage unit 110 and displays them on the UI control unit 120. Then, the AFP identification unit 102 updates the storage unit 110 and the screen based on the operation performed by the user on the screen displayed by the UI control unit 120, and repeats the process of causing the UI control unit 120 to display the updated screen to identify the autofluorescence population.

The AFP identification unit 102 includes a target selection unit 106, an AFP separation unit 107, and an AFP selection unit 108. The target selection unit 106 performs processing related to selection of target data used to identify the autofluorescence population. The AFP separation unit 107 performs processing related to separation of the autofluorescence population. The AFP selection unit 108 performs processing related to selection of the autofluorescence population used in the fluorescence separation process from the separated autofluorescence population. The fluorescence separation process is described in JP 5540952 B2, JP 5601098 B2, JP 5834584 B2, and JP 5985140 B2.

(Storage Unit)

The storage unit 110 is storage means included in the information processing apparatus 10, and stores information and the like obtained by each functional unit of the information processing apparatus 10. Further, the storage unit 110 appropriately outputs the stored information in response to a request from each functional unit of the information processing apparatus 10. The storage unit 110 stores, for example, autofluorescence data acquired by the measurement data acquisition unit 101, data related to processing by the AFP identification unit 102, and the like. The storage unit 110 also stores execution data such as programs corresponding to various applications used by the UI control unit 120 to display various information on the display screen. The storage unit 110 appropriately stores temporary data and the like that may occur during processing by the information processing apparatus 10. In addition, the storage unit 110 may be provided with various databases. The various databases may be, for example, databases storing the above-described autofluorescence data or data related to processing by the AFP identification unit 102.

(UI Control Unit)

The UI control unit 120 performs display control of a display screen of a display device (not illustrated) such as a display included in the information processing apparatus 10 or a display device such as a display provided outside the information processing apparatus 10. For example, the UI control unit 120 performs display control of the screen created by the AFP identification unit 102.

The UI control unit 120 also accepts an operation of the user on the displayed screen, and notifies the AFP identification unit 102 of information corresponding to the accepted operation. For example, the UI control unit 120 accepts a gate operation by the user, and notifies the AFP identification unit 102 of information on the created gate. Further, the UI control unit 120 accepts a selection operation by the user, and notifies the AFP identification unit 102 of the selected information.

1.4 Examples of Screens Used to Identify Autofluorescence Population

Next, examples of the autofluorescence screen used to identify the autofluorescence population will be described with reference to FIGS. 5 to 7. FIG. 5 is a diagram illustrating an example of an autofluorescence screen used to identify an autofluorescence population. As illustrated in FIG. 5, an autofluorescence screen 2 includes a number-of-events selection part 2a used for selecting the number of events and a graphic shape selection part 2b used for selecting a graphic shape for creating a gate. There are a rectangle, an oval and a polygon as a graphic shape for creating a gate.

The autofluorescence screen 2 includes, as parts associated with the user's operation step, the step #1 (corresponding to Step 1 on the screen) part 3, the step #2 (corresponding to Step 2 of the screen) part 4, and the step #3 (corresponding to Step 3 of the screen) part 5. The step #1 part 3 is processed by the target selection unit 106, the step #2 part 4 is processed by the AFP separation unit 107, and the step #3 part 5 is processed by the AFP selection unit 108.

Figure 6A:
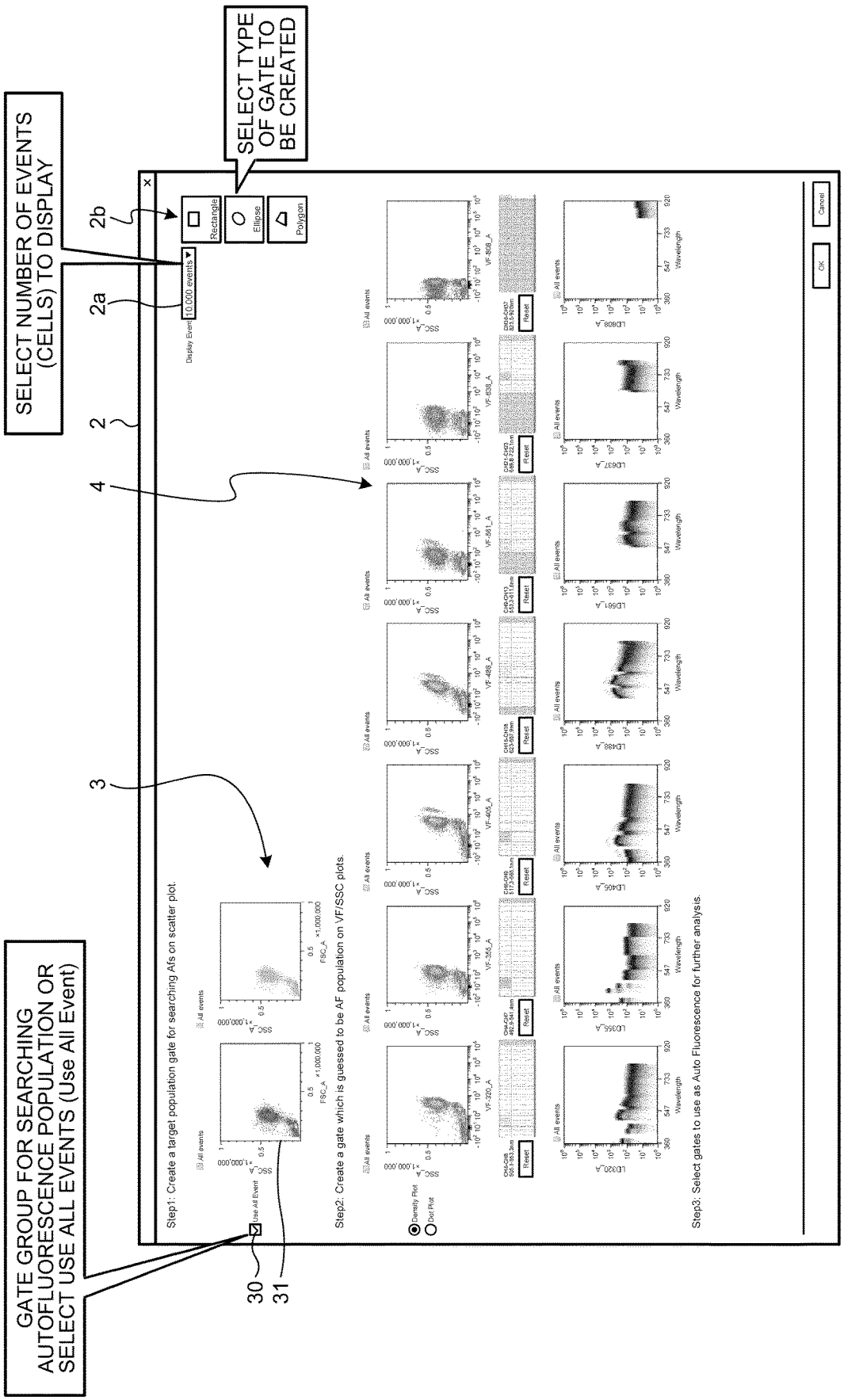
FIG. 6A is a diagram illustrating an initial state of the autofluorescence screen.

FIG. 6A is a diagram illustrating an initial state of the autofluorescence screen 2. As illustrated in FIG. 6A, the step #3 part 5 is not displayed in the initial state. In the initial state, the user uses the number-of-events selection part 2a to select the number of events. Then, the AFP identification unit 102 displays the step #1 part 3 and the step #2 part 4 using autofluorescence data of the selected number of events. Note that although the AFP identification unit 102 causes the UI control unit 120 to display the screen, hereinafter, "causes the UI control unit 120 to display" is simply referred to as "display" to simplify the description.

In step #1, the AFP identification unit 102 creates and displays a two-dimensional plot 31 using autofluorescence data. The user uses a target selection button 30 to select whether to gate the group for searching the autofluorescence population or to use all events displayed. The user selects a graphic shape from the graphic shape selection part 2b when gating a group for searching an autofluorescence population (when the target selection button 30 is not checked).

The AFP identification unit 102 accepts the selection by the user. Note that although the AFP identification unit 102 accepts an operation by the user via the UI control unit 120, hereinafter, "accept via the UI control unit 120" is simply referred to as "accept" to simplify the description.

FIG. 6B is an enlarged view of the step #1 part 3. As illustrated in FIG. 6B, the x-axis (FSC_A: Forward SCatter Area) of the two-dimensional plot 31 is the intensity of forward scattered light, and the y-axis (SCC_A: Side SCatter Area) is the intensity of side scattered light. "_A" represents that the measured value is a cumulative intensity. Further, the AFP identification unit 102 displays a message (Step 1: Create a target population gate for searching Auto Fluorescene on scatter plot) prompting creation of a gate of target data used to identify an autofluorescence population.

The user selects target data to be used to identify the autofluorescence population by performing gating on the displayed two-dimensional plot 31. When accepting the selection of the target data, the AFP identification unit 102 creates and displays a two-dimensional plot 32 of the selected target data.

Figure 6C:
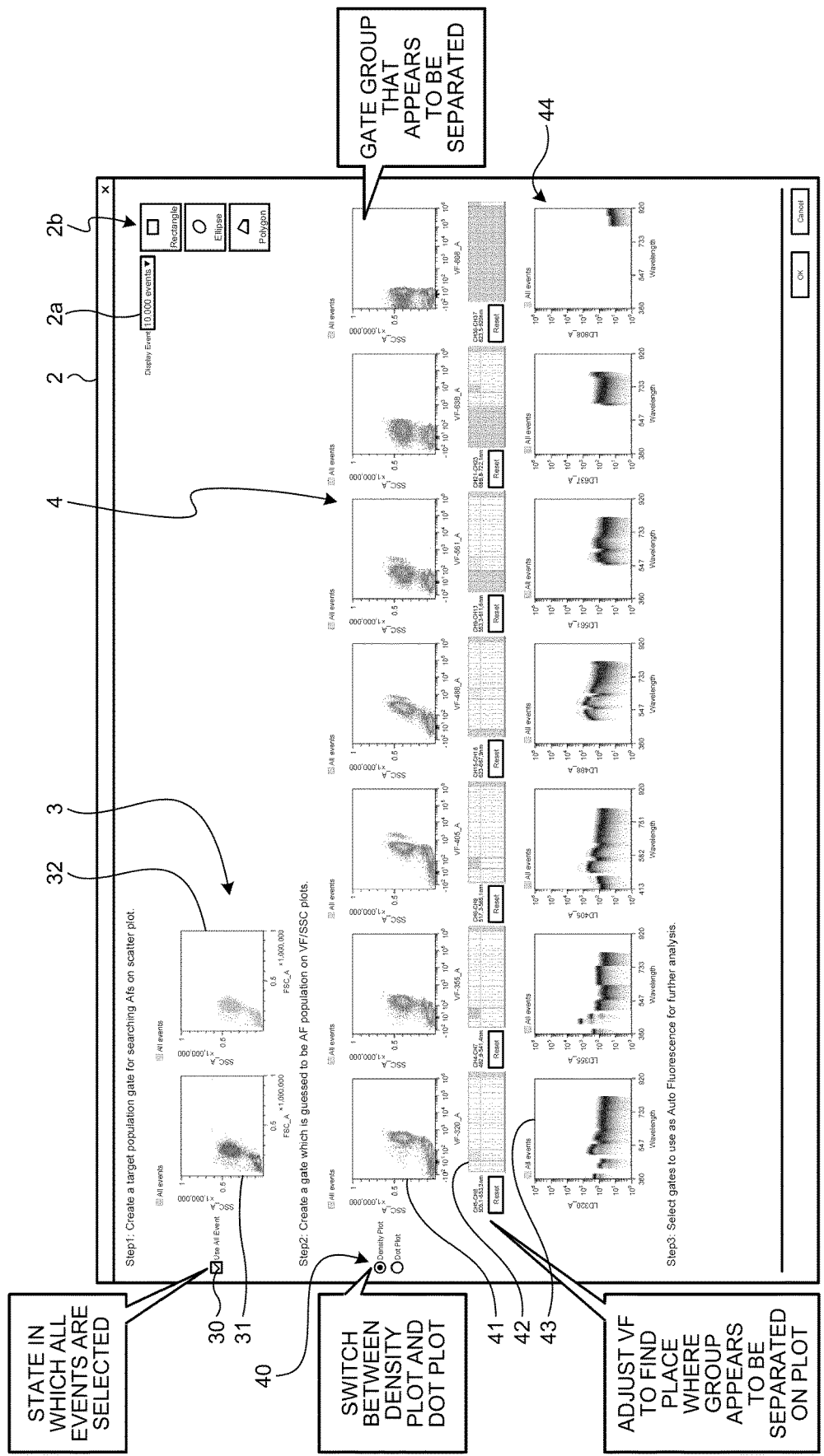
FIG. 6C is a diagram illustrating a state in which target data is selected.

FIG. 6C is a diagram illustrating a state in which target data is selected. In FIG. 6C, the target selection button 30 is checked, and all events have been selected for identification of the autofluorescence population. In step #2, the AFP identification unit 102 creates and displays a two-dimensional plot 41, a Virtual Filter (VF) adjustment window 42, and a spectral plot 43 for each laser light source 21 with respect to the target data selected in step #1.

In the two-dimensional plot 41, either the density plot or the dot plot is selected by a plot selection toggle button 40. Here, the density plot is a representation of the information on the number of events in shading or tone of color, and the dot plot is a representation in which there is no information on the number of events. The VF is a filter whose wavelength range to be displayed of the fluorescence intensity can be adjusted, and the wavelength range to be displayed of the fluorescence intensity is adjusted by the VF adjustment window 42.

FIG. 6D is a diagram illustrating the two-dimensional plot 41, the VF adjustment window 42 and the spectral plot 43 for one laser light source 21. As illustrated in FIG. 6D, the x-axis (VF-320_A) of the two-dimensional plot 41 is the intensity of light filtered by VF, and the y-axis (SCC_A) is the intensity of side scattered light. The AFP identification unit 102 updates the two-dimensional plot 41 in conjunction with the adjustment of the wavelength range by the VF adjustment window 42. Adjustment by the VF adjustment window 42 is performed by channel or wavelength. "320" is the wavelength (nm) of the laser light source 21. Here, the two-dimensional plot 41 only needs to be displayed so that the target data can be separated from the measurement data, and the two axes of the two-dimensional plot 41 can be selected from the light intensity of side scattered light or forward scattered light, or the light intensity of in the wavelength range in advance by the VF, or the like. The two-dimensional plot 41 may have one axis that represents the light intensity in the first wavelength range, and the other axis that represents the light intensity in the second wavelength range.

The x-axis of the spectral plot 43 is the wavelength or channel, and the y-axis (LD 320_A) is the fluorescence intensity. "320" is the wavelength (nm) of the laser light source 21. The shading of color indicates information about the number of events.

Returning to FIG. 6C, the AFP identification unit 102 displays, as step #2, a message (Step 2: Create a gate which is guessed to be AF population on VF/SSC plots) prompting creation of a gate estimated to be an autofluorescence population. The user adjusts the wavelength range using the VF adjustment window 42 to gate the autofluorescence population using the two-dimensional plot 41 in which the target data is separated into a plurality of groups. The user can perform gating using any number of two-dimensional plots 41 out of seven two-dimensional plots 41.

FIG. 6F is a diagram illustrating a state in which the autofluorescence population is separated, and FIG. 6G is an enlarged view of part of the step #2 part 4 of FIG. 6F. In FIG. 6G, gating is performed using the two-dimensional plot 41 corresponding to laser light sources 21 with wavelengths of 320 nm and 405 nm to create four gates 45.

When the creation of the gates 45 is accepted, the AFP identification unit 102 displays the gates 45 in different colors in the two-dimensional plot 41. For example, the AFP identification unit 102 displays the respective four gates 45 in red, blue, purple, and green. Further, the AFP identification unit 102 similarly colors and updates the two-dimensional plot 32 displayed in step #1.

Further, in the spectral plot 43, the AFP identification unit 102 superimposes an average spectral intensity 46 indicating the average of the spectral intensity of the data belonging to each gate on a spectral intensity 47 of the entire target data in the same color as the color of the gate of the two-dimensional plot 41 to display them. In the spectral plot 43, the spectral intensity 47 of the entire target data is displayed, for example, in gray scale. The user determines the autofluorescence population used in the fluorescence separation process by checking the relationship between the average spectral intensity 46 and the spectral intensity 47 of the entire target data.

In step #3, as illustrated in FIG. 6F, the AFP identification unit 102 displays a message (Step 3: Select gates to use as Auto Fluorescence for further analysis) prompting the selection of the autofluorescence population used in the fluorescence separation process, and a list 51 of the gate created in step #2. FIG. 6H is an enlarged view of the list 51. As illustrated in FIG. 6H, the list 51 includes "Use as AF", "Use as Base", "Gate", "Events", "Parent %", and "Total %".

"Use as AF" indicates whether the gate is selected by the user as an autofluorescence population to be used in the fluorescence separation process. The gates marked with a check mark are autofluorescence populations used in the fluorescence separation process. The user selects the autofluorescence population to be used in the fluorescence separation process by checking "Use as AF".

"Use as Base" indicates whether the gate is selected by the user as the basic autofluorescence population in the fluorescence separation process. The snake eye gate is the gate selected as the basic autofluorescence population. The user selects the basic autofluorescence population by marking the snake eye in "Use as Base". The fluorescence separation process includes:
1) subtracting the spectrum of the basic autofluorescence population from the spectrum of each stained cell;
2) performing fluorescence separation processing using the spectral reference and the spectrum of the autofluorescence population other than the spectrum of the basic autofluorescence population; and
3) adding back the fluorescence intensity of the basic autofluorescence population to the fluorescence intensity of each dye as a result of fluorescence separation. The user usually selects the autofluorescence population with the lowest fluorescence intensity as the basic autofluorescence population. Here, the basic autofluorescence population may not be selected, in which case step 1) and step 3) are not implemented, and the fluorescence separation process is performed in step 2) using the reference spectrum and all the autofluorescence spectra, so that The fluorescence intensity of each dye can be acquired. Whether to select "Use as Base" may be determined by the user. The least square method or the weighted least square method is used for the fluorescence separation process.

"Gate" is a name that identifies a gate. "AF-A", "AF-B", "AF-C" and "AF-D" are gate names created by the AFP identification unit 102. The square on the left of the gate name indicates the color of the gate.

"Events" is the number of data belonging to the gate. "Parent %" indicates the ratio of the number of data of the gate to the number of data of the parent gate in %. "Total %" indicates the ratio of the number of data of the gate to the total number of data of the target data in %. In FIG. 6H, since the total number of target data is "10,000", and the entire target data is the parent gate, for example, when the number of data of gate "AF-A" is "766", "Parent %" is "7.66%", and "Total %" is "7.66%".

FIG. 5 illustrates the autofluorescence screen 2 when measurement is performed using all seven laser light sources 21. When some laser light sources 21 are not used, the autofluorescence screen 2 includes the two-dimensional plot 41, the VF adjustment window 42 and the spectral plot 43 for the number of laser light sources 21 used. FIG. 7 is a view illustrating an example of an autofluorescence screen 2c when only five laser light sources 21 are used. As illustrated in FIG. 7, since the laser light sources 21 with wavelengths of 355 nm and 808 nm are not used, the two-dimensional plot 41, the VF adjustment window 42, and the spectral plot 43 based on the measurement data using the laser light sources 21 with wavelengths of 355 nm and 808 nm are not displayed.

1.5 Processing Flow of Identifying Autofluorescence Population

Figure 8:
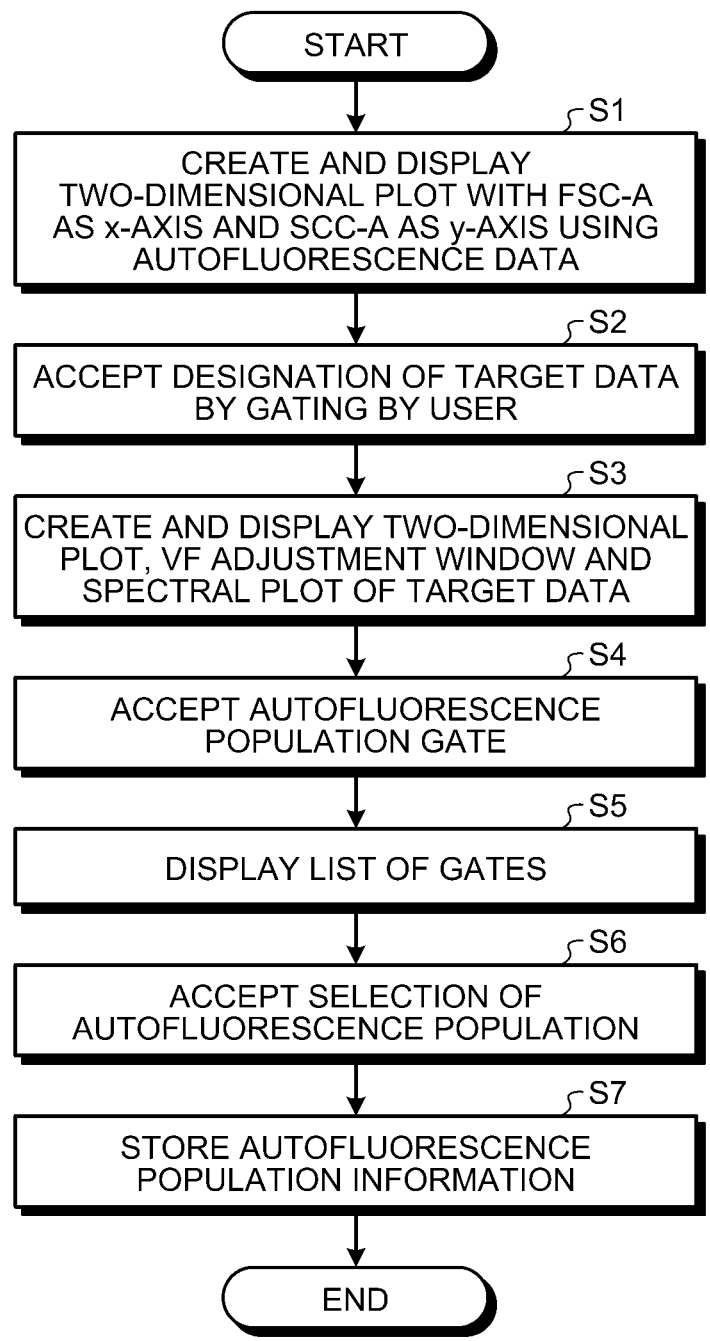
FIG. 8 is a flowchart illustrating a processing flow of identifying an autofluorescence population.

Next, the flow of processing for identifying an autofluorescence population will be described. FIG. 8 is a flowchart illustrating a processing flow of identifying an autofluorescence population. As illustrated in FIG. 8, the AFP identification unit 102 creates and displays the two-dimensional plot 31 with FSC_A as the x-axis and SCC_A as the y-axis using autofluorescence data (step S1). Then, the AFP identification unit 102 accepts designation of target data by gating performed by the user (step S2). When accepting the designation of the target data, the AFP identification unit 102 displays the two-dimensional plot 32 of the target data.

Then, the AFP identification unit 102 creates and displays the two-dimensional plot 41, the VF adjustment window 42, and the spectral plot 43 of the target data (step S3). Note that the AFP identification unit 102 updates the two-dimensional plot 41 when accepting the user's channel designation using the VF adjustment window 42. Also, when the user operation on the spectral plot 43 is accepted, the AFP identification unit 102 updates the spectral plot 43. Then, the AFP identification unit 102 accepts the gate of the autofluorescence population from the user (step S4). The AFP identification unit 102 updates the spectral plot 43, the two-dimensional plot 32, and the two-dimensional plot 41 when accepting the gate of the autofluorescence population from the user.

Then, when the designation of the gate of the autofluorescence population by the user is completed, the AFP identification unit 102 displays the list 51 of the gates (step S5), and accepts the selection of the autofluorescence population from the user in the list 51 of the gates (step S6). Then, the AFP identification unit 102 stores the information of the selected autofluorescence population in the storage unit 110 (step S7).

As described above, the AFP identification unit 102 can make it easy for the user to select the autofluorescence population by displaying the autofluorescence screens 2 and 2c including the two-dimensional plots 31, 32 and 41, the spectral plot 43, the list 51 of gates, and the like.

1.6. Ribbon Plot Display and User Operation Flow

The AFP separation unit 107 can control display of a spectral plot of measurement data as well as autofluorescence data. Here, as the number of the laser light sources 21 mounted in the measurement apparatus 20 increases, a wide screen area is required to display a spectral plot corresponding to each of the laser light sources 21. Furthermore, since it is necessary to perform processing such as axis switching processing for each spectral plot, it is required to display and control the spectral plots corresponding to a plurality of laser light sources collectively. Therefore, the AFP separation unit 107 can control the display of a ribbon plot 44 in which spectral plots corresponding to the laser light sources 21 used for measurement are displayed side by side.

Figure 6E:
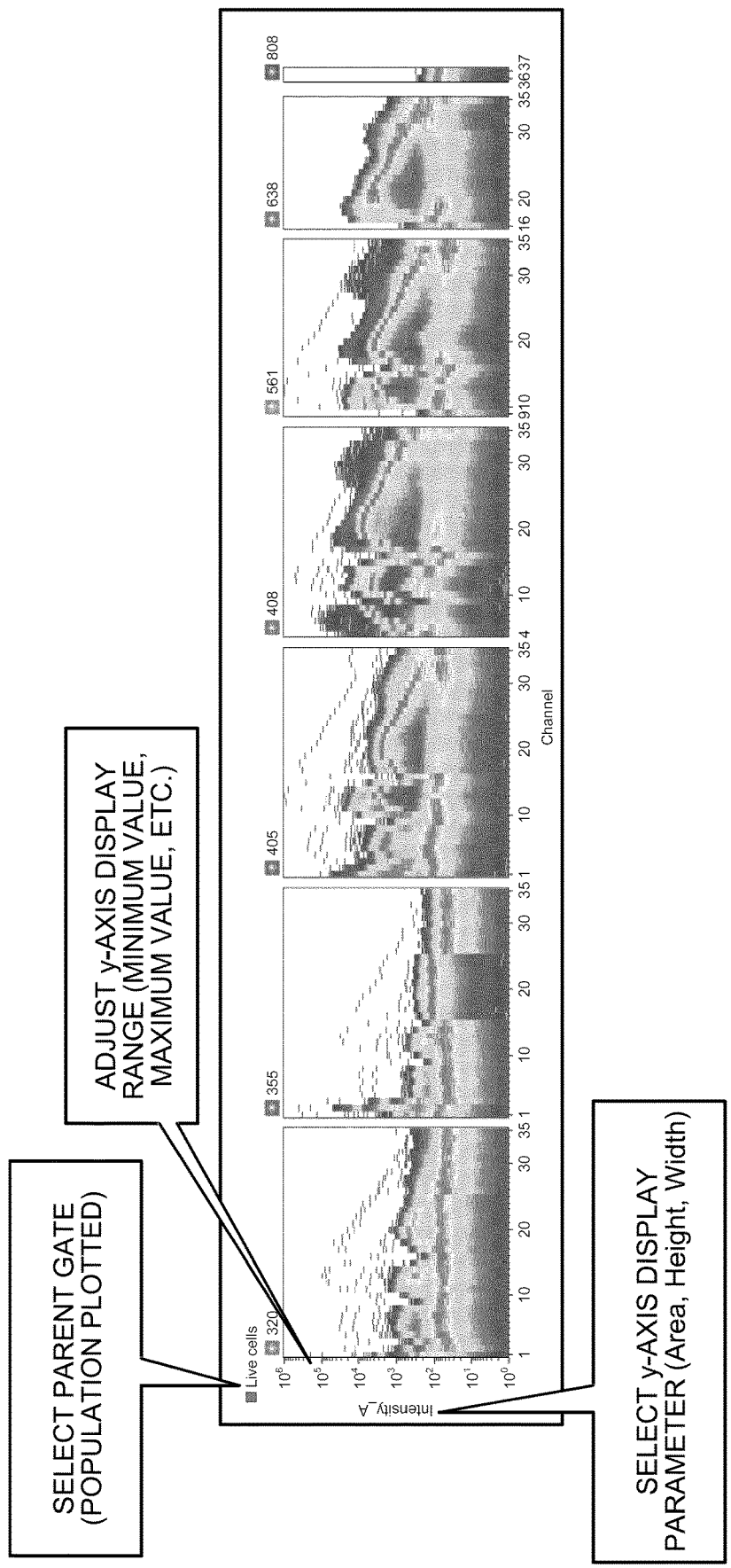
FIG. 6E is a diagram for explaining display of a ribbon plot and a user operation.

FIG. 6E is a diagram for explaining display of the ribbon plot 44 and user operation. As illustrated in FIG. 6E, in the ribbon plot 44, it is possible to display the intensity of the fluorescence obtained by radiating the excitation light of each laser light source 21 as a spectrum side by side. The horizontal axis indicates the intensity of light, and the vertical axis indicates the channel of a light receiving element unit 231 provided corresponding to each laser light source. Here, the horizontal axis does not provide the same channel memory width for all the laser light sources 21, but sets the memory width of the channel according to the light receiving element unit 231 corresponding to each laser light source 21, so that it is possible to reduce the display area.

Also, as illustrated in FIG. 6E, the user can select a group for displaying the ribbon plot 44, select a display parameter of the y-axis of the ribbon plot 44, and adjust the display range of the y-axis in the ribbon plot 44. Here, in the display parameters, display of the spectrum is related to any of Area (cumulative intensity), Height (maximum intensity), or Width (detection time width). The AFP separation unit 107 updates the ribbon plot 44 according to the selection of the display parameter and the adjustment of the display range. As a result, the user does not have to select parameters, select a display target, or the like for each laser light source 21, and can easily grasp the fluorescence spectrum information of the microparticles.

Furthermore, the ribbon plot 44 makes it possible to set a gate by user operation, and it is possible to display the two-dimensional plot, the spectral plot 43, and the ribbon plot 44 according to the set gate.

1.7 Effects

As described above, according to the present embodiment, the target selection unit 106 displays the two-dimensional plot 31 and accepts from the user the selection of autofluorescence data used to identify the autofluorescence population. Then, the AFP separation unit 107 displays the two-dimensional plot 41, the VF adjustment window 42, and the spectral plot 43 for a plurality of optical axes, and accepts the autofluorescence population separated by the user in the two-dimensional plot 41. Then, the AFP separation unit 107 updates the two-dimensional plot 41 with the color of the autofluorescence population to be separated, and superimposes the average spectral intensity 46 of the autofluorescence population to be separated on the spectral plot 43 and displays them in different colors. Here, different colors indicate that one of hue, lightness, and saturation is different. Then, the AFP selection unit 108 displays the list 51, and urges the user to select the autofluorescence population used for the fluorescence separation process. Thus, the user can easily identify the autofluorescence population to be used for the fluorescence separation process.

In this embodiment, since the AFP selection unit 108 accepts selection of the autofluorescence population used as the basic autofluorescence population in the fluorescence separation process in the list 51, the user can select the basic autofluorescence population together with the selection of the autofluorescence population.

Further, in the present embodiment, the measurement apparatus 20 includes the N laser light sources 21 for irradiating the microparticle S with excitation lights in different axes and the N light receiving element units 231 for detecting a fluorescence spectrum emitted from the microparticle S by radiation of the laser lights by the corresponding laser light sources 21. Therefore, the measurement apparatus 20 can collect abundant fluorescence spectrum data efficiently.

Further, in the present embodiment, since the measurement apparatus 20 stores the parameters and labels used for measurement, the user can efficiently perform the measurement by reusing the parameters used in the past.

1.8 Example of Hardware Configuration of Information Processing Apparatus

Figure 9:
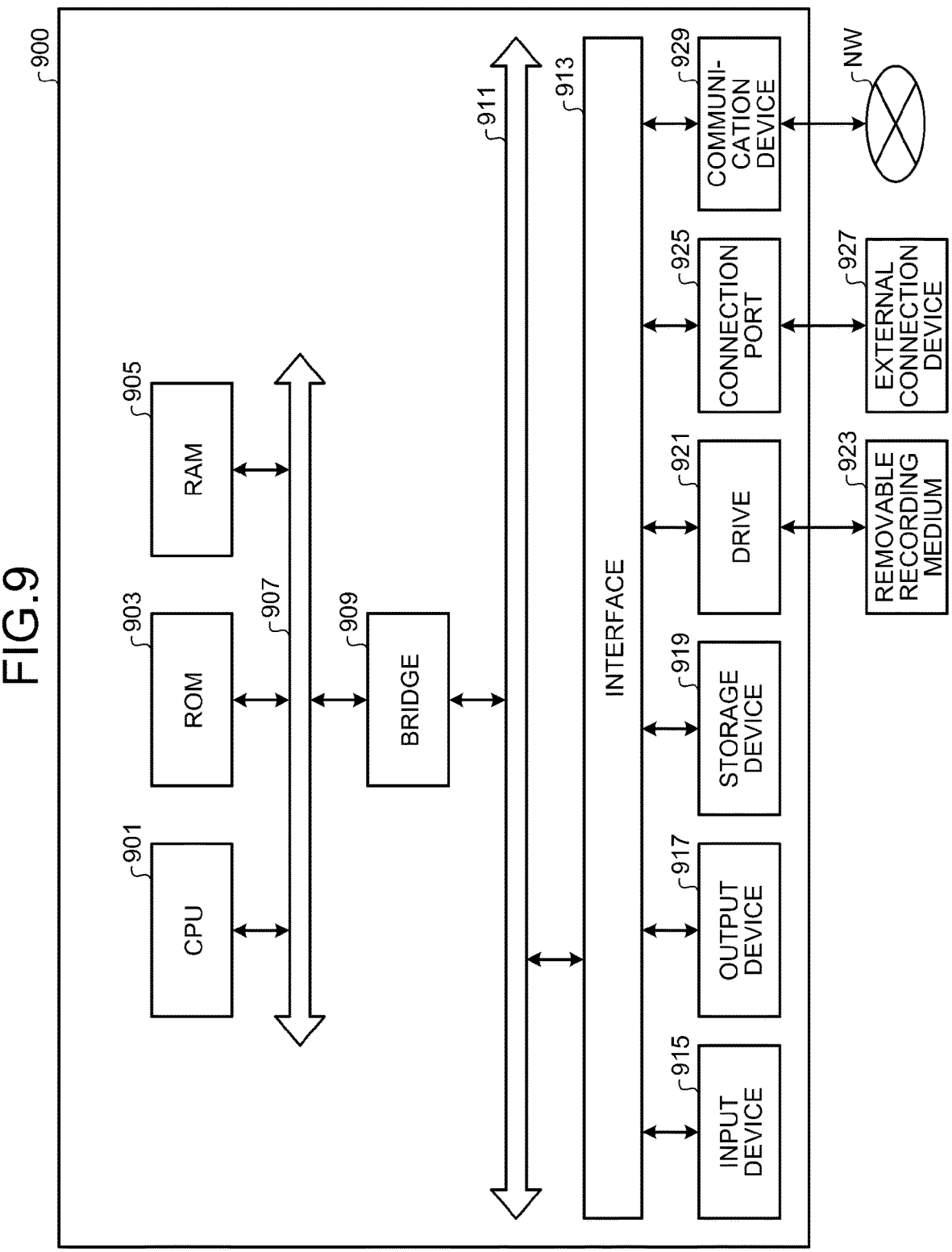
FIG. 9 is a block diagram illustrating an example of a hardware configuration of an information processing apparatus according to an embodiment of the present disclosure.

Next, the hardware configuration of the information processing apparatus according to an embodiment of the present disclosure will be described with reference to FIG. 9. FIG. 9 is a block diagram illustrating an example of a hardware configuration of an information processing apparatus according to an embodiment of the present disclosure. An illustrated information processing apparatus 900 can realize, for example, the information processing apparatus 10 in the above embodiment.

The information processing apparatus 900 includes a central processing unit (CPU) 901, a read only memory (ROM) 903, and a random access memory (RAM) 905. The information processing apparatus 900 further includes a host bus 907, a bridge 909, an external bus 911, an interface 913, an input device 915, an output device 917, a storage device 919, a drive 921, a connection port 925, and a communication device 929. The information processing apparatus 900 may include, instead of the CPU 901, or together with this, a processing circuit called a digital signal processor (DSP) or an application specific integrated circuit (ASIC).

The CPU 901 functions as an arithmetic processing device and a control device, and controls the entire operation or part of the operation of the information processing apparatus 900 according to various programs recorded in the ROM 903, the RAM 905, the storage device 919, or a removable recording medium 923. For example, the CPU 901 controls the entire operation of respective functional units included in the information processing apparatus 10 in the above embodiment. The ROM 903 stores programs, calculation parameters, and the like used by the CPU 901. The RAM 905 primarily stores programs used in the execution of the CPU 901, parameters that appropriately change in the execution, and the like. The CPU 901, the ROM 903 and the RAM 905 are mutually connected by the host bus 907 constituted by an internal bus such as a CPU bus. Further, the host bus 907 is connected to the external bus 911 such as a peripheral component interconnect/interface (PCI) bus via the bridge 909.

The input device 915 is, for example, a device operated by the user, such as a mouse, a keyboard, a touch panel, a button, a switch, and a lever. The input device 915 may be, for example, a remote control device using infrared rays or other radio waves, or may be an external connection device 927 such as a mobile phone corresponding to the operation of the information processing apparatus 900. The input device 915 includes an input control circuit that generates an input signal based on information input by the user and outputs the generated signal to the CPU 901. The user operates the input device 915 to input various data to the information processing apparatus 900 and instruct processing operation.

The output device 917 is configured by a device capable of visually or aurally notifying the user of the acquired information. The output device 917 may be, for example, a display device such as an LCD, a PDP, or an OELD, an acoustic output device such as a speaker or a headphone, a printer device, or the like. The output device 917 outputs the result obtained by the process of the information processing apparatus 900 as a video in a form of a text or an image or outputs it as an acoustic sound.

The storage device 919 is a device for data storage configured as an example of a storage unit of the information processing apparatus 900. The storage device 919 is configured by, for example, a magnetic storage unit device such as a hard disk drive (HDD), a semiconductor storage device, an optical storage device, or a magneto-optical storage device. The storage device 919 stores programs and various data executed by the CPU 901, various data acquired from the outside, and the like. The storage device 919 can realize the function of the storage unit 110 according to the above embodiment.

The drive 921 is a reader/writer for the removable recording medium 923 such as a magnetic disk, an optical disk, a magneto-optical disk, or a semiconductor memory, and is built in or externally attached to the information processing apparatus 900. The drive 921 reads out the information recorded in the mounted removable recording medium 923 and outputs the information to the RAM 905. The drive 921 also writes a record on the mounted removable recording medium 923.

The connection port 925 is a port for directly connecting equipment to the information processing apparatus 900. The connection port 925 may be, for example, a Universal Serial Bus (USB) port, an IEEE 1394 port, a small computer system interface (SCSI) port, or the like. Further, the connection port 925 may be an RS-232C port, an optical audio terminal, a High-Definition Multimedia Interface (HDMI) (registered trademark) port, or the like. By connecting the external connection device 927 to the connection port 925, various data can be exchanged between the information processing apparatus 900 and the external connection device 927.

The communication device 929 is, for example, a communication interface configured by a communication device or the like for the connection to the communication network NW. The communication device 929 may be, for example, a communication card for a wired or wireless local area network (LAN), a Bluetooth (registered trademark), or a wireless USB (WUSB). Further, the communication device 929 may be a router for optical communication, a router for asymmetric digital subscriber line (ADSL), a modem for various types of communication, or the like. The communication device 929 transmits and receives signals and the like to and from the Internet or another communication device using a predetermined protocol such as the TCP/IP. The communication network NW connected to the communication device 929 is a network connected by wire or wirelessly, and is, for example, the Internet, a home LAN, infrared communication, radio wave communication, satellite communication, or the like.

1.9 Summary

The preferred embodiment of the present disclosure has been described in detail with reference to the accompanying drawings, but the technical scope of the present disclosure is not limited to such examples. It is obvious that those skilled in the art of the present disclosure can conceive of various changes or modifications within the scope of the technical idea described in the claims. It is understood that they also fall within the technical scope of the present disclosure.

For example, although the particle analysis system 1 is configured to include the information processing apparatus 10 and the measurement apparatus 20 in the above embodiment, the present technology is not limited to such an example. For example, the information processing apparatus 10 may have the function (measurement function) of the measurement apparatus 20. In this case, the particle analysis system 1 is realized by the information processing apparatus 10. In addition, the measurement apparatus 20 may have the functions (data acquisition function, autofluorescence identification function, and UI control function) of the information processing apparatus 10. In this case, the particle analysis system 1 is realized by the measurement apparatus 20. In addition, the measurement apparatus 20 may have part of the functions of the information processing apparatus 10, and the information processing apparatus 10 may have part of the functions of the measurement apparatus 20. Further, the information processing apparatus 10 may have only the autofluorescence identification function. In this case, other functions may be realized by another information processing apparatus or the like.

It is also possible to create a computer program for causing hardware such as a CPU, a ROM, and a RAM incorporated in the information processing apparatus to exert the functions equivalent to those of respective configurations of the above-described information processing apparatus. There is also provided a storage medium storing the computer program.

In addition, the effects described in the present specification are merely illustrative or exemplary, and not limiting. That is, the technology according to the present disclosure may exhibit other effects apparent to those skilled in the art from the description of the present specification, in addition to or instead of the effects described above.

The following configurations are also within the technical scope of the present disclosure.

(1)
An information processing apparatus comprising:
an AFP separation unit that displays a two-dimensional plot with autofluorescence intensity and side scattered light intensity as axes and a spectral plot for autofluorescence data, and displays spectral intensity of an autofluorescence population specified in the two-dimensional plot, where the spectral intensity of the autofluorescence population is superimposed on the spectral plot.

(2)
The information processing apparatus according to (1), wherein the AFP separation unit displays the two-dimensional plot and the spectral plot with respect to each optical axis for autofluorescence data measured using a plurality of optical axes, and displays the spectral intensity of the autofluorescence population specified in a plurality of two-dimensional plots, where the spectral intensity of the autofluorescence population is superimposed on the spectral plots.

(3)
The information processing apparatus according to (1) or (2), wherein the AFP separation unit accepts a changing operation of a parameter that specifies any of cumulative intensity, maximum intensity, and a detection time width in a measurement time width with respect to the spectral intensity of the spectral plot, and updates the spectral plot.

(4)
The information processing apparatus according to (1), (2) or (3), wherein the AFP separation unit superimposes and displays the spectral intensity for the autofluorescence data and average spectral intensity of the autofluorescence population in different colors.

(5)
The information processing apparatus according to any one of (1) to (4), further comprising an AFP selection unit that displays a list of the autofluorescence populations, and accepts selection of an autofluorescence population used for a fluorescence separation process and selection of an autofluorescence population used as a basic autofluorescence population in the fluorescence separation process.

(6)
An information processing method comprising:
displaying, by a processor, a two-dimensional plot with autofluorescence intensity and side scattered light intensity as axes and a spectral plot for autofluorescence data, and displaying spectral intensity of an autofluorescence population specified in the two-dimensional plot, where the spectral intensity of the autofluorescence population is superimposed on the spectral plot.

(7)
A program causing a computer to function as an AFP separation unit that displays a two-dimensional plot with autofluorescence intensity and side scattered light intensity as axes and a spectral plot for autofluorescence data, and displays spectral intensity of an autofluorescence population specified in the two-dimensional plot, where the spectral intensity of the autofluorescence population is superimposed on the spectral plot.

(8)
An information processing system comprising:
a measurement apparatus including a plurality of measurement units that irradiate an object to be measured with lights using a plurality of optical axes and measure spectral relating to light emissions of the object to be measured; and
an information processing apparatus including an AFP separation unit that displays a two-dimensional plot with autofluorescence intensity and side scattered light intensity of a specific wavelength as axes and a spectral plot with respect to each optical axis for autofluorescence data measured by the measurement apparatus, and displays spectral intensity of an autofluorescence population specified in the two-dimensional plot, where the spectral intensity of the autofluorescence population is superimposed on the spectral plot.

(9)
The information processing system according to (8), wherein
the measurement apparatus further includes
a storage unit that stores a parameter used for measurement.

(10)
A particle analysis system comprising:
a light detector that acquires light generated by irradiating a particle with excitation light; and
an information processing unit that outputs a spectral plot including spectrum information of an autofluorescence population specified in a two-dimensional plot of measurement data each of which corresponds to the acquired light and spectrum information of the measurement data and that records the spectrum information of the autofluorescence population as an autofluorescence reference spectrum in a fluorescence separation process.

(11)

The particle analysis system according to (10), wherein the two-dimensional plot has one axis that represents a light intensity in a predetermined wavelength range, and the information processing unit outputs the two-dimensional plot.

(12)

The particle analysis system according to (11), wherein the two-dimensional plot has one axis that represents a light intensity in a predetermined wavelength range and the other axis that represents a light intensity of scattered light.

(13)

The particle analysis system according to (10), (11), or (12), wherein
the light detector includes a light receiving element unit, and wherein the spectral plot has one axis that represents a channel or a detection wavelength of the light receiving element unit and the other axis that represents a light intensity.

(14)

The particle analysis system according to any one of (10) to (13), wherein
the light detector acquires light generated by irradiating the particle with a plurality of excitation light beams having different wavelength ranges, and
the two-dimensional plot and the spectral plot are displayed in the same number as the plurality of excitation light beams.

(15)

The particle analysis system according to any one of (10) to (14), wherein the spectrum information of the autofluorescence population is an average value of spectrum information of measurement data corresponding to particles included in the autofluorescence population.

(16)

The particle analysis system according to any one of (10) to (15), wherein
a plurality of the autofluorescence populations are specified in the two-dimensional plot, and
the information processing unit outputs spectrum information of the plurality of autofluorescence populations as a list and records the spectrum information of the autofluorescence populations specified in the list as the autofluorescence reference spectrum.

(17)

The particle analysis system according to any one of (10) to (16), wherein the spectral plot is displayed so that spectrum information of the autofluorescence population and spectrum information of the measurement data have different colors.

(18)

The particle analysis system according to any one of (10) to (17), wherein
the light detector acquires fluorescent light generated by irradiating a particle labeled with a fluorescent dye with excitation light, and
the information processing unit acquires fluorescence intensity information of the fluorescent dye by performing a fluorescence separation process on spectrum information of measurement data corresponding to the acquired fluorescent light using the recorded autofluorescence reference spectrum.

(19)

The particle analysis system according to (18), wherein the fluorescence separation process is performed by a least square method or a weighted least square method using a spectral reference including the recorded autofluorescence reference spectrum.

(20)

The particle analysis system according to any one of (10) to (19), wherein the particle is a cell.

(21)

The particle analysis system according to any one of (10) to (20), further comprising:
an irradiation unit that radiates the excitation light; and
a flow path part through which the particle flows.

(22)

An information processing method comprising:
by a processor,
outputting a spectral plot including spectrum information of an autofluorescence population specified in a two-dimensional plot of measurement data each of which corresponds to light generated by irradiating a particle with excitation light and spectrum information of the measurement data; and
recording the spectrum information of the autofluorescence population as an autofluorescence reference spectrum in a fluorescence separation process.

(23)

A program causing a computer to function as
an information processing unit that outputs a spectral plot including spectrum information of an autofluorescence population specified in a two-dimensional plot of measurement data each of which corresponds to light generated by irradiating a particle with excitation light and spectrum information of the measurement data and that records the spectrum information of the autofluorescence population as an autofluorescence reference spectrum in a fluorescence separation process, wherein the two-dimensional plot has at least one axis that represents a light intensity corresponding to light generated by any one of a plurality of excitation light beams.

REFERENCE SIGNS LIST 1 particle analysis system
2, 2c autofluorescence screen
3 step #1 part
4 step #2 part
5 step #3 part
10 information processing apparatus
20 measurement apparatus
20a setting saving unit
20b setting storage unit
20c search unit
21 laser light source
22 micro channel
23 light detector
31 two-dimensional plot
41 two-dimensional plot
42 VF adjustment window
43 spectral plot
44 ribbon plot
45 gate
46 average spectral intensity
47 spectral intensity
51 list
101 measurement data acquisition unit 102 AFP identification unit
106 target selection unit
107 AFP separation unit
108 AFP selection unit
110 storage unit
120 UI control unit
230 detector
231 light receiving element unit

The invention claimed is:

1. A particle analysis system comprising:
a light detector that acquires light generated by irradiating a particle with excitation light; and
an information processor that outputs a spectral plot including spectrum information of a plurality of autofluorescence populations specified in a two-dimensional plot of measurement data corresponding to the acquired light and spectrum information of the measurement data, wherein
the information processor outputs spectrum information of the plurality of autofluorescence populations as a list and records the spectrum information of the autofluorescence populations specified in the list as an autofluorescence reference spectrum, and
one or more of the plurality of autofluorescence populations is selected from the list to be used in a fluorescence separation process, and
the information processor performs the fluorescence separation process based on the selected autofluorescence population or populations from the list, thereby removing the spectrum information of the selected autofluorescence population or populations from the list from the spectrum information of the measurement data.

2. The particle analysis system according to claim 1, wherein the two-dimensional plot has one axis that represents a light intensity in a predetermined wavelength range, and the information processor outputs the two-dimensional plot.

3. The particle analysis system according to claim 2, wherein the two-dimensional plot has one axis that represents a light intensity in a predetermined wavelength range and the other axis that represents a light intensity of scattered light.

4. The particle analysis system according to claim 1, wherein the light detector includes a light receiving element, and the spectral plot has one axis that represents a channel or a detection wavelength of the light receiving element and the other axis that represents a light intensity.

5. The particle analysis system according to claim 1, wherein the light detector acquires the light generated by irradiating the particle with a plurality of excitation light beams having different wavelength ranges, and the two-dimensional plot and the spectral plot are displayed in the same number as the plurality of excitation light beams.

6. The particle analysis system according to claim 1, wherein the spectrum information of each autofluorescence population is an average value of spectrum information of measurement data corresponding to particles included in each autofluorescence population.

7. The particle analysis system according to claim 1, wherein the spectral plot is displayed so that the spectrum information of each autofluorescence population and the spectrum information of the measurement data have different colors.

8. The particle analysis system according to claim 1, wherein the light detector acquires fluorescent light generated by irradiating a particle labeled with a fluorescent dye with the excitation light, and the information processor acquires fluorescence intensity information of the fluorescent dye by performing the fluorescence separation process on spectrum information of measurement data corresponding to the acquired fluorescent light using the selected autofluorescence population or populations from the list.

9. The particle analysis system according to claim 8, wherein the fluorescence separation process is performed by a least square method or a weighted least square method using a spectral reference including the recorded autofluorescence reference spectrum.

10. The particle analysis system according to claim 1, wherein the particle is a cell.

11. The particle analysis system according to claim 1, further comprising:
an irradiator that radiates the excitation light; and
a flow path part through which the particle flows.

12. An information processing method comprising:
by a processor,
outputting a spectral plot including spectrum information of a plurality of autofluorescence populations specified in a two-dimensional plot of measurement data corresponding to light generated by irradiating a particle with excitation light and spectrum information of the measurement data, wherein
the spectrum information of the plurality of autofluorescence populations is output as a list and the spectrum information of the autofluorescence populations specified in the list is recorded as an autofluorescence reference spectrum, and
one or more of the plurality of autofluorescence populations is selected from the list to be used in a fluorescence separation process, and
the fluorescence separation process is performed based on the selected autofluorescence population or populations from the list, thereby removing the spectrum information of the selected autofluorescence population or populations from the list from the spectrum information of the measurement data.

13. A non-transitory computer readable medium storing instructions that, when executed by a computer, cause the computer to function as
an information processor that outputs a spectral plot including spectrum information of a plurality of autofluorescence populations specified in a two-dimensional plot of measurement data corresponding to light generated by irradiating a particle with excitation light and spectrum information of the measurement data, wherein
the spectrum information of the plurality of autofluorescence populations is output as a list and the spectrum information of the autofluorescence populations specified in the list is recorded as an autofluorescence reference spectrum, and
one or more of the plurality of autofluorescence populations is selected from the list to be used in the fluorescence separation process, and
the fluorescence separation process is performed based on the selected autofluorescence population or populations from the list, thereby removing the spectrum information of the selected autofluorescence population or populations from the list from the spectrum information of the measurement data, and
the two-dimensional plot has at least one axis that represents a light intensity corresponding to light generated by any one of a plurality of excitation light beams.

* * * * *